US010929966B2

(12) United States Patent
Chirayath

(10) Patent No.: US 10,929,966 B2
(45) Date of Patent: Feb. 23, 2021

(54) SYSTEM AND METHOD FOR IMAGING UNDERWATER ENVIRONMENTS USING FLUID LENSING

(71) Applicant: United States of America as Represented by the Administrator of the NASA, Washington, DC (US)

(72) Inventor: Ved Chirayath, Palo Alto, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 76 days.

(21) Appl. No.: 16/393,569

(22) Filed: Apr. 24, 2019

(65) Prior Publication Data
US 2019/0266712 A1 Aug. 29, 2019

Related U.S. Application Data
(60) Provisional application No. 62/634,803, filed on Feb. 24, 2018.

(51) Int. Cl.
G06K 9/62 (2006.01)
G06T 5/50 (2006.01)
(Continued)

(52) U.S. Cl.
CPC .............. G06T 5/50 (2013.01); G06T 5/006 (2013.01); G06T 7/514 (2017.01);
(Continued)

(58) Field of Classification Search
CPC ........... G06T 5/50; G06T 5/006; G06T 7/514; G06T 2207/10032; G06T 2207/20216; G06T 2207/30192
(Continued)

(56) References Cited

U.S. PATENT DOCUMENTS 6,449,215 B1 * 9/2002 Shell ..................... G01S 7/6245
367/7
9,305,378 B1 * 4/2016 Holmes .............. G02B 26/0808
(Continued)

Primary Examiner — Gabriel I Garcia
(74) Attorney, Agent, or Firm — Rhys W. Cheung; Robert M. Padilla

(57) ABSTRACT

Systems and methods are described for correcting distorted images captured of underwater environments. Caustics are used to provide additional illumination to underwater objects, and lenslets from ocean wave fluid lensing are used to magnify a benthic scene for enhancing the effective resolution of the images. The process introduces a fluid distortion characterization methodology, caustic bathymetry concepts, fluid lensing lenslet homography technique, two dimensional image reconstruction process, and three dimensional airborne fluid lensing process for characterizing the aquatic surface wave field, modelling bathymetry using caustic phenomena, and robust high-resolution aquatic remote sensing. Performing remote sensing using fluid lensing, also referred to as the fluid lensing process, utilizes high-frame-rate multispectral remote sensing data to remove ocean wave distortions from an image, to enhance the resolution of an image by exploiting ocean waves, and to enhance the signal strength of an image otherwise impaired by optical absorption in the water column.

10 Claims, 15 Drawing Sheets
(10 of 15 Drawing Sheet(s) Filed in Color)

(51) Int. Cl.
  *G06T 5/00*         (2006.01)
  *G06T 7/514*        (2017.01)
(52) U.S. Cl.
  CPC .............. *G06T 2207/10032* (2013.01); *G06T 2207/20216* (2013.01); *G06T 2207/30192* (2013.01)
(58) Field of Classification Search
  USPC ......................................................... 382/255
  See application file for complete search history.

(56) References Cited

U.S. PATENT DOCUMENTS

| | | | |
|---|---|---|---|
| 10,041,833 B1* | 8/2018 | Chirayath | G01J 3/108 |
| 2015/0078123 A1* | 3/2015 | Batcheller | G01S 15/86 |
| | | | 367/7 |
| 2017/0085864 A1* | 3/2017 | Yang | G06T 7/521 |
| 2018/0165870 A1* | 6/2018 | Stokes | G06T 15/08 |

* cited by examiner

SYSTEM AND METHOD FOR IMAGING UNDERWATER ENVIRONMENTS USING FLUID LENSING

CROSS-REFERENCE TO RELATED APPLICATIONS

This application claims the benefit of U.S. Provisional Application No. 62/634,803, filed on Feb. 24, 2018, the contents of which are incorporated by reference as if fully set forth herewith.

ORIGIN OF INVENTION

The invention described herein was made by an employee of the United States Government and may be manufactured and used by or for the Government of the United States of America for governmental purposes without the payment of any royalties thereon or therefor.

FIELD OF THE INVENTION

The present embodiments relate to image enhancement and correction, and more particularly, to using fluid lensing to enhance and correct distorted images captured through ocean waves of underwater environments.

BACKGROUND OF THE INVENTION

The optical interaction of light with fluids and aquatic surfaces is a complex phenomenon. The effect is readily observable above 71% of Earth's surface in aquatic systems, in particular, shallow marine reef environments. Surface wave distortion and optical absorption of light pose a significant challenge for remote sensing of underwater environments, compounding an already profound lack of knowledge about our planet's most commonplace, biologically diverse, and life-sustaining ecosystems. At present, no remote sensing technologies can robustly image underwater objects at the cm-scale or finer due to surface wave distortion and the strong attenuation of light in the water column, in stark contrast to modern terrestrial remote sensing capabilities. As a consequence, our ability to accurately assess the status and health of shallow marine ecosystems, such as coral and stromatolite reefs, is severely impaired. As ocean acidification, global warming, sea level rise, and habitat destruction increasingly impact these ecosystems, there is an urgent need for the development of remote sensing technologies that can image underwater environments at the cm-scale, or 'reef-scale', characteristic of typical reef accretion rates of ~1 cm per year.

BRIEF SUMMARY OF EMBODIMENTS OF THE INVENTION

Embodiments are presented for a novel high-resolution aquatic remote sensing technique for imaging through ocean waves by harnessing the optical effects of fluid lensing lenslets and caustic bands. As visible light interacts with aquatic surface waves, time-dependent nonlinear optical aberrations appear, forming caustic bands of light on the seafloor, and producing refractive lensing that magnifies and demagnifies underwater objects. This fluid lensing phenomenon in the context of ocean waves can be exploited to image underwater environments at the cm-scale, or "reef-scale."

Optical lensing elements that magnify, also called fluid lensing lenslets, are used to enhance the spatial resolution and signal-to-noise properties of remote sensing instruments. The process introduces a fluid distortion characterization methodology, caustic bathymetry concepts, fluid lensing lenslet homography technique, two dimensional image reconstruction process, and three dimensional airborne fluid lensing process as novel approaches for characterizing the aquatic surface wave field, modelling bathymetry using caustic phenomena, and robust high-resolution aquatic remote sensing.

Results from a test pool set up for testing embodiments of the invention reveal previously unquantified depth-dependent caustic behavior including caustic focusing and the formation of caustic cells. Caustic focusing shows that, in the case of the test pool, the intensity of a caustic band at a depth of 2.5 m can exceed the above-surface ambient intensity at 0 m depth, despite two absorptive optical path lengths in the fluid. 2D Fluid Lensing results demonstrate multispectral imaging of test targets in depths up to 4.5 m at a resolution of at least 0.25 cm versus a raw fluid-distorted frame with a resolution less than 25 cm. Enhanced signal-to-noise ratio gains of over 4 dB are also measured in comparison to a perfectly flat fluid surface scenario with less than one-second of simulated remotely-sensed image data.

Unmanned aerial vehicles (UAVs, or drones) are employed in real-world aquatic systems to capture images at depths up to 10 m. In some embodiments, an Airborne Fluid Lensing Process is employed to produce images of coral reefs and stromatolite reefs with unprecedented resolution, providing the first validated cm-scale 3D image of a reef acquired from above the ocean surface, without wave distortion, in the span of a few flight hours over areas as large as 15 km$^2$. These 3D data distinguish coral, fish, and invertebrates in American Samoa, and reveal previously undocumented, morphologically distinct, stromatolite structures in Shark Bay. The data represent the highest-resolution remotely-sensed 3D multispectral image of an underwater environment to date, acquired from above a nonplanar fluid interface.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

Figure 2:
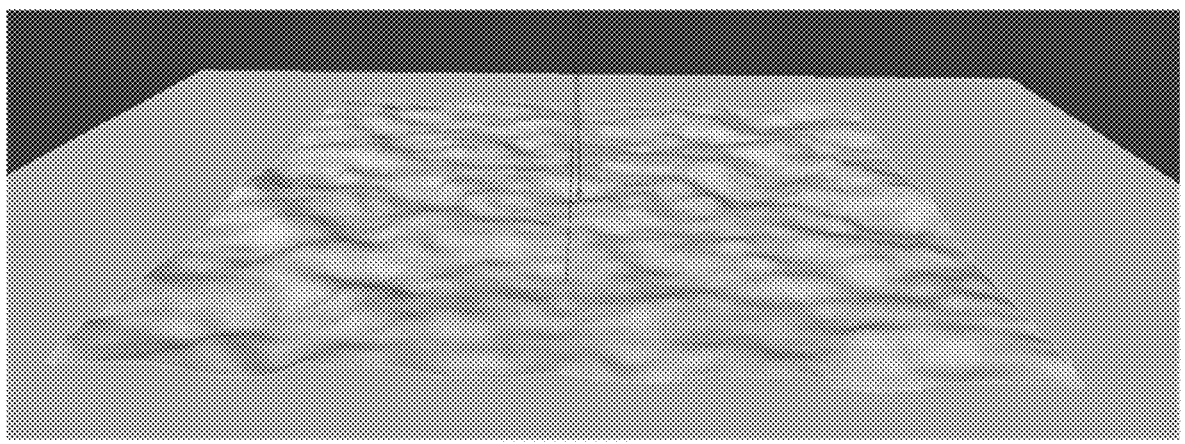

An example of an ocean surface wave mesh generated using this technique is shown in FIG. 2.

Figure 3:
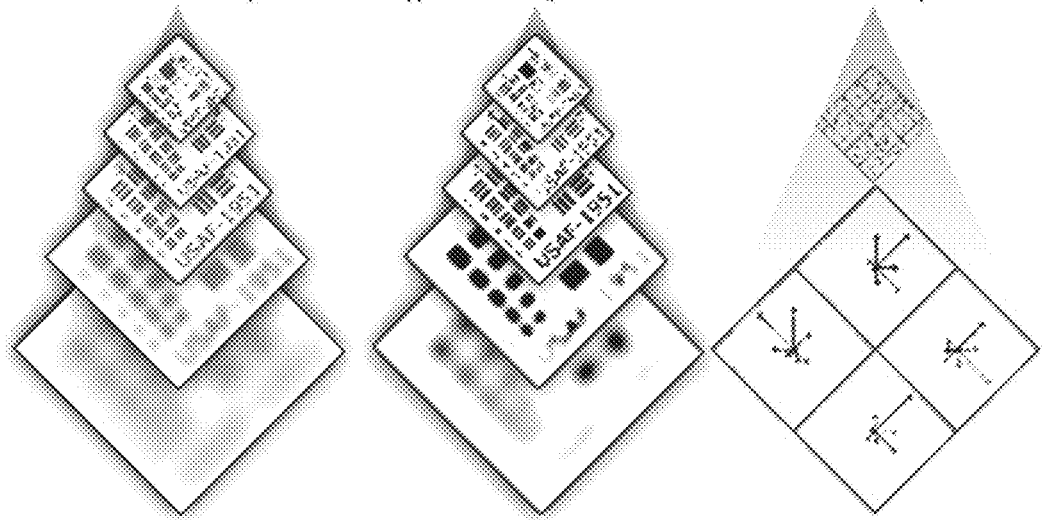
Figure 3:
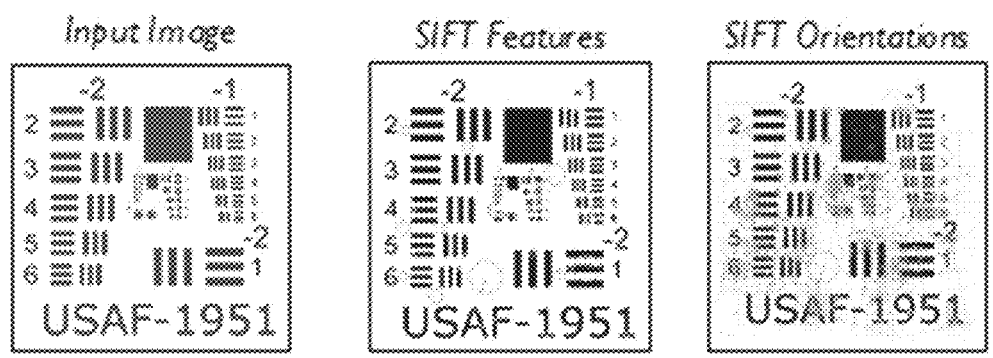
Figure 3:

FIG. 3 illustrates the SIFT keypoint detector and feature matching using Euclidean distance and filtering by a geometric mapping solved by random sample consensus (RANSAC), according to some embodiments.

Figure 4:
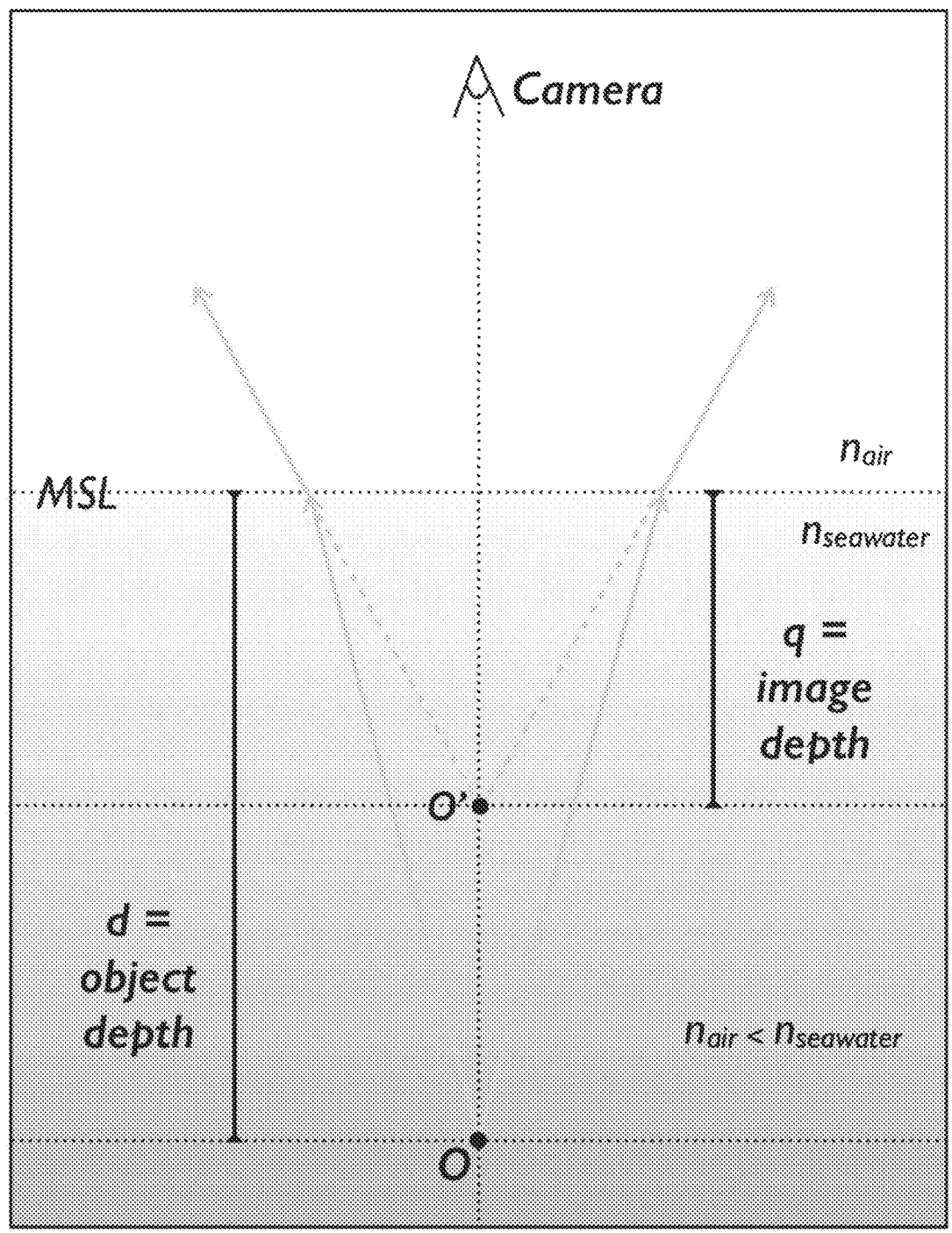

FIG. 4 is a diagram illustrating the apparent depth distortion effect of air-seawater optical interaction, assuming a flat fluid surface, according to some embodiments.

Figure 5:
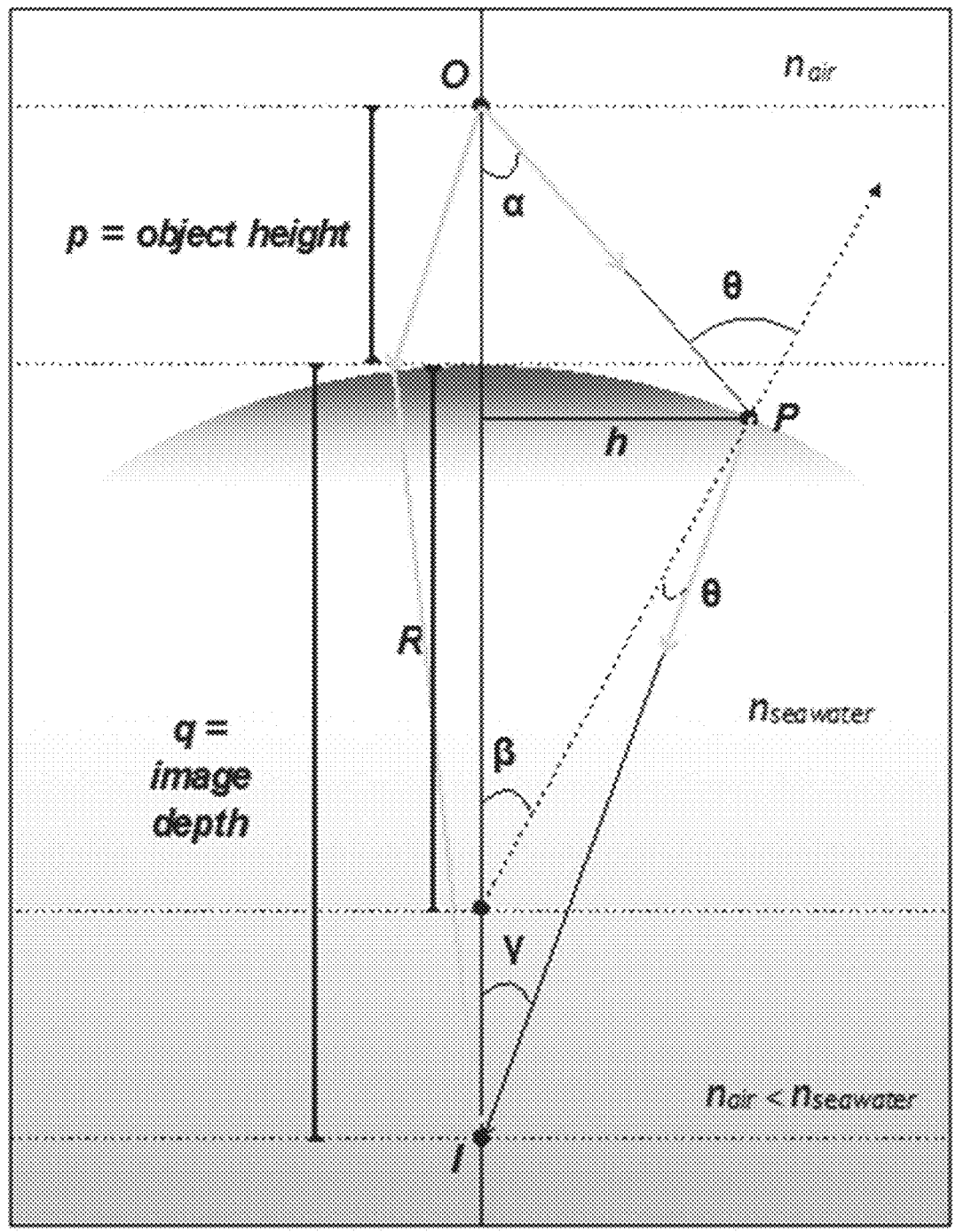

FIG. 5 is a diagram illustrating the effect of focusing of light rays refraction in the presence of a fluid lenslet, which provides a curved fluid surface, according to some embodiments.

Figure 6:
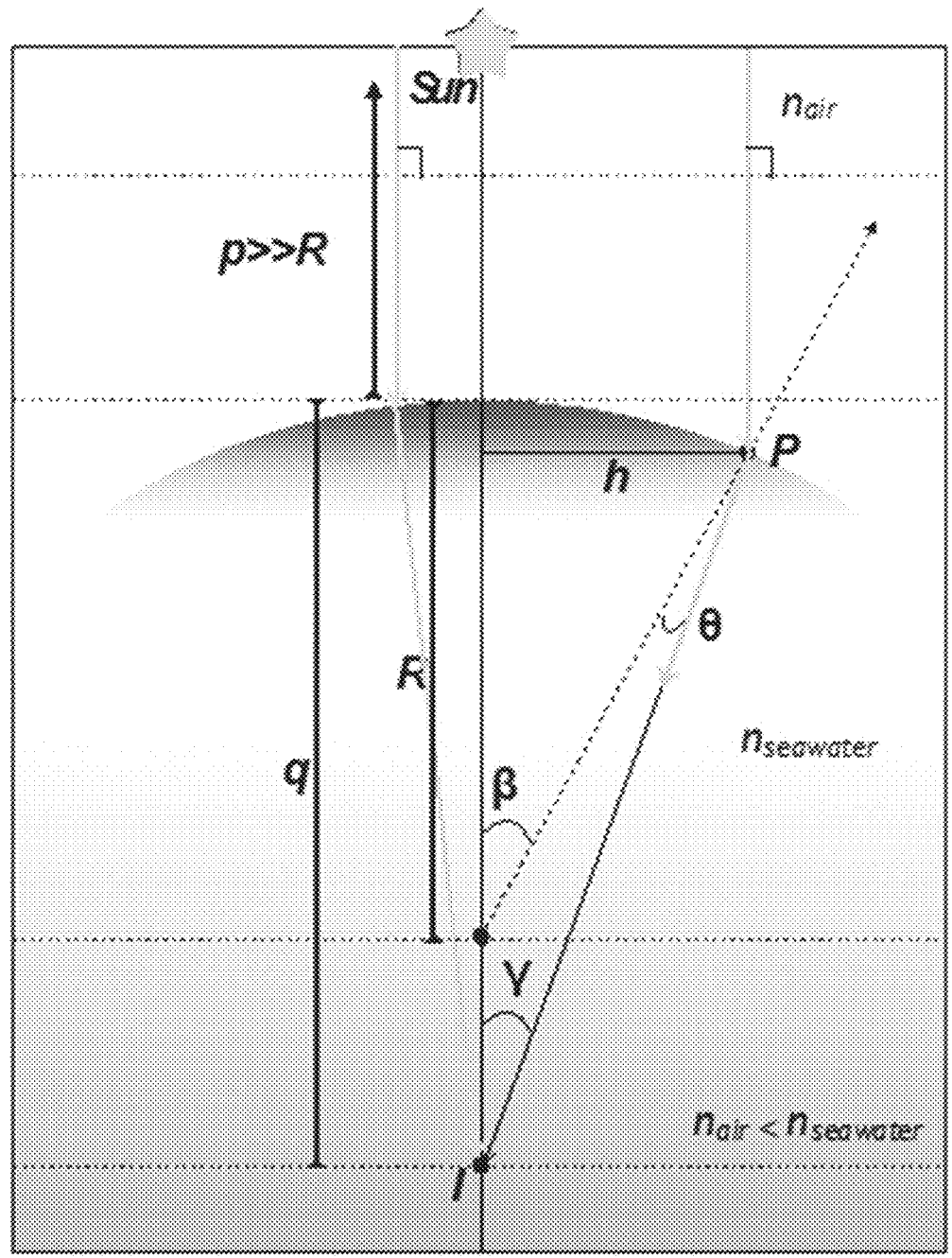

FIG. 6 is a diagram illustrating the effect of the Sun's illuminating a refractive lenslet surface to form a caustic, according to embodiments.

Figure 7:
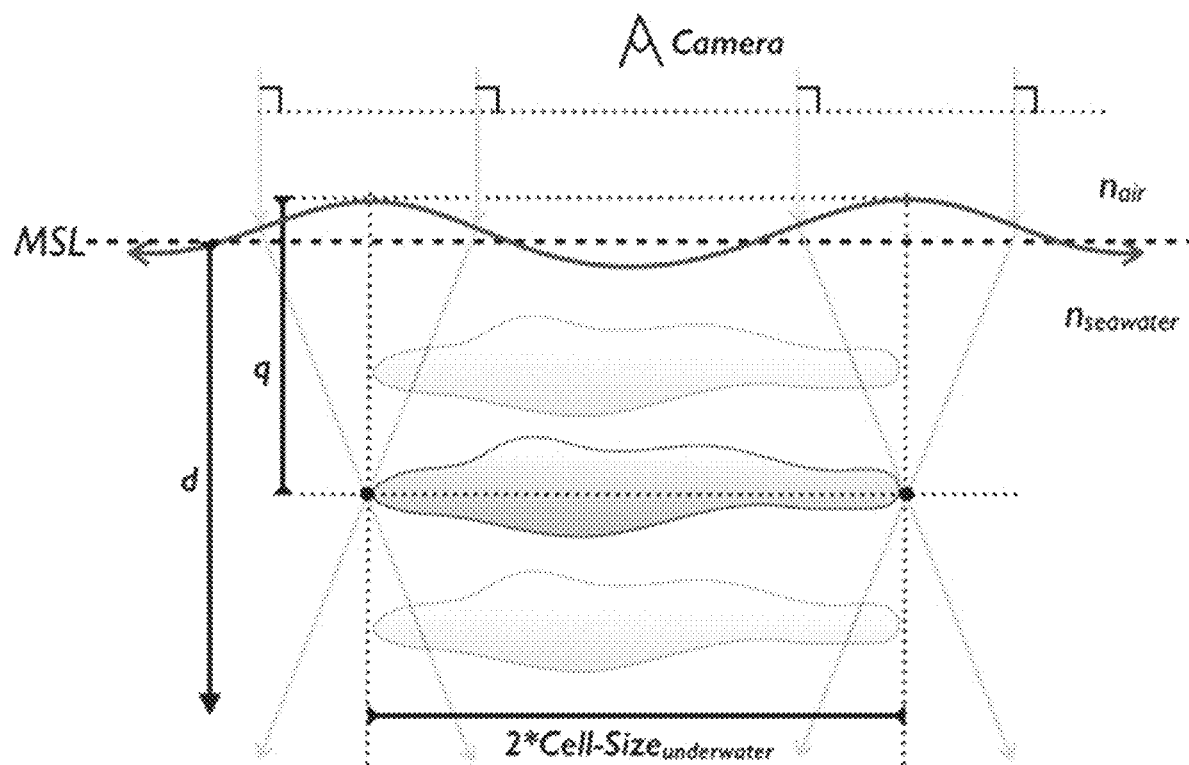

FIG. 7 is a diagram illustrating a symmetric lenslet train, according to embodiments.

Figure 8:
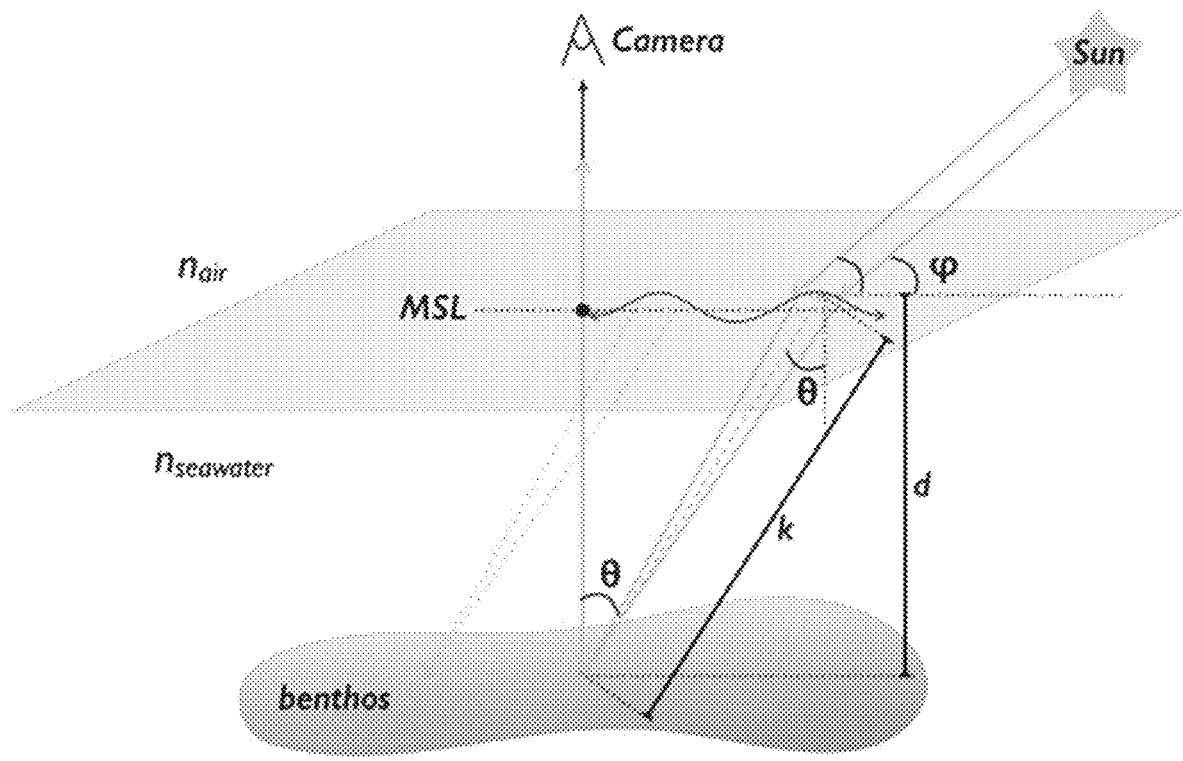

FIG. 8 is a diagram illustrating the effect of a refractive lenslet on magnifying a benthic object, with a non-nadir Sun angle with respect to the fluid surface, according to some embodiments.

Figure 9:
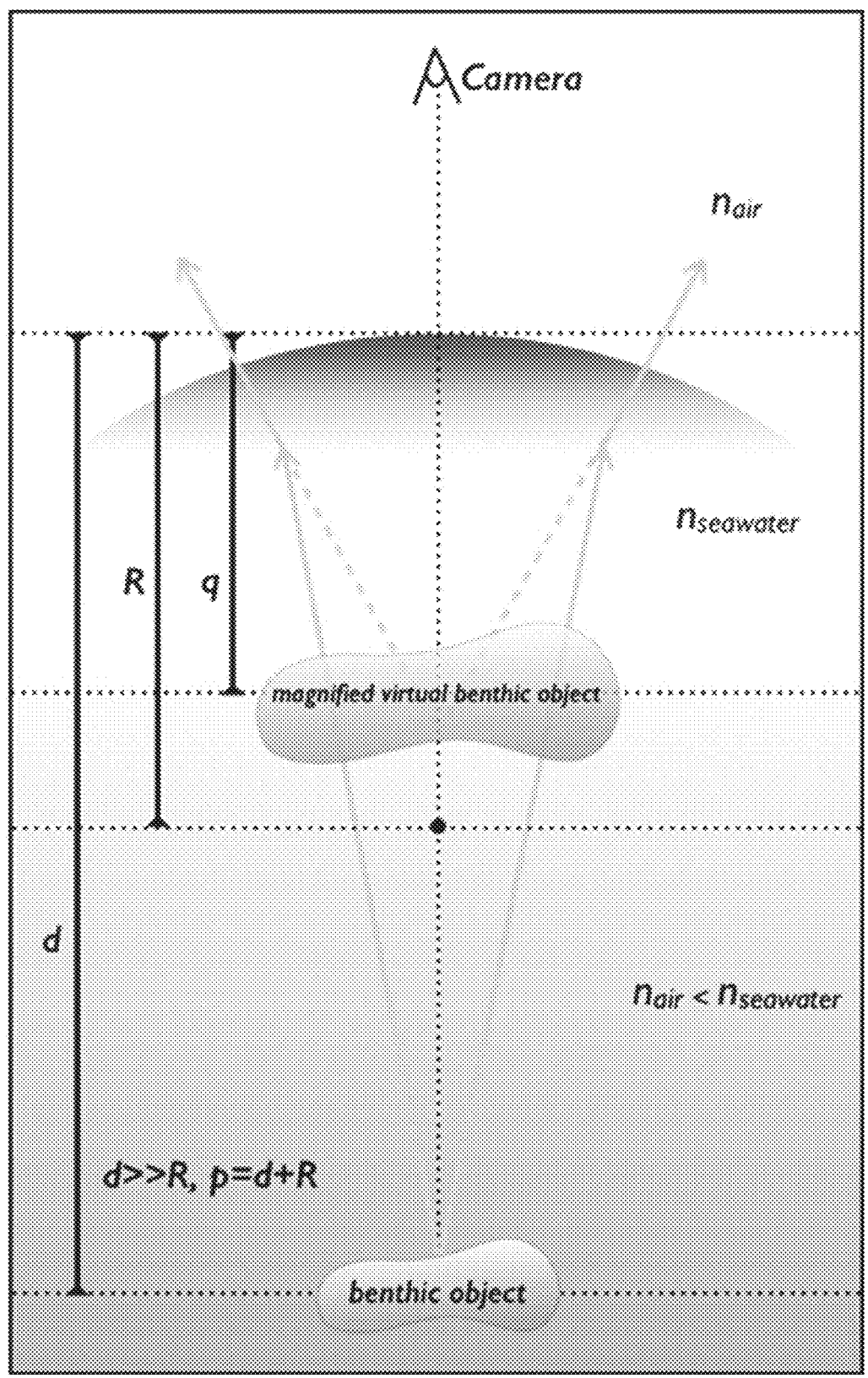

FIG. 9 is a diagram illustrating the further magnification of a submerged object in introducing a curvature of a lenslet at the interface, according to some embodiments.

Figure 10:
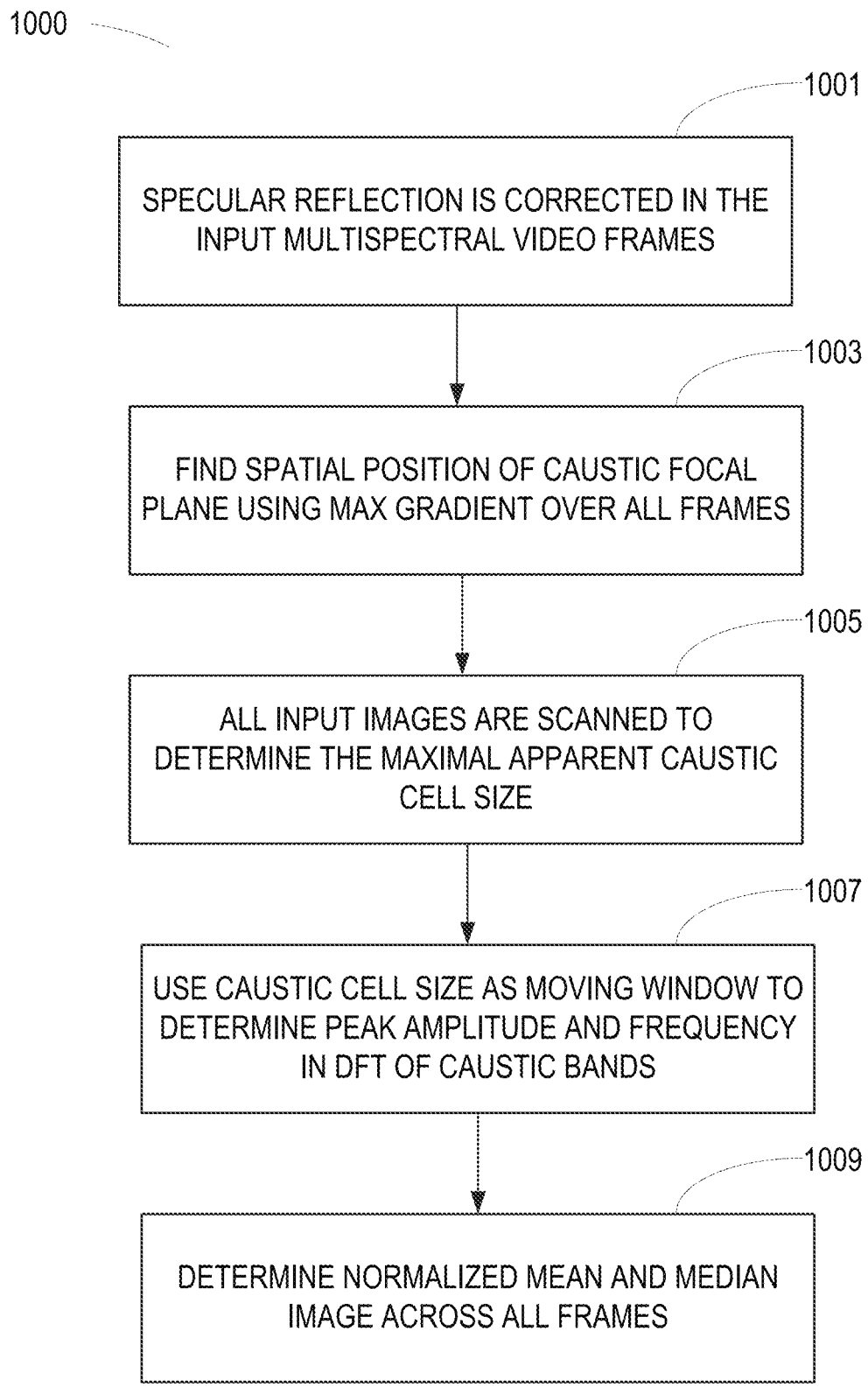

FIG. 10 is a flow diagram illustrating fluid distortion characterization phase of the fluid lensing process, according to some embodiments.

Figure 11:
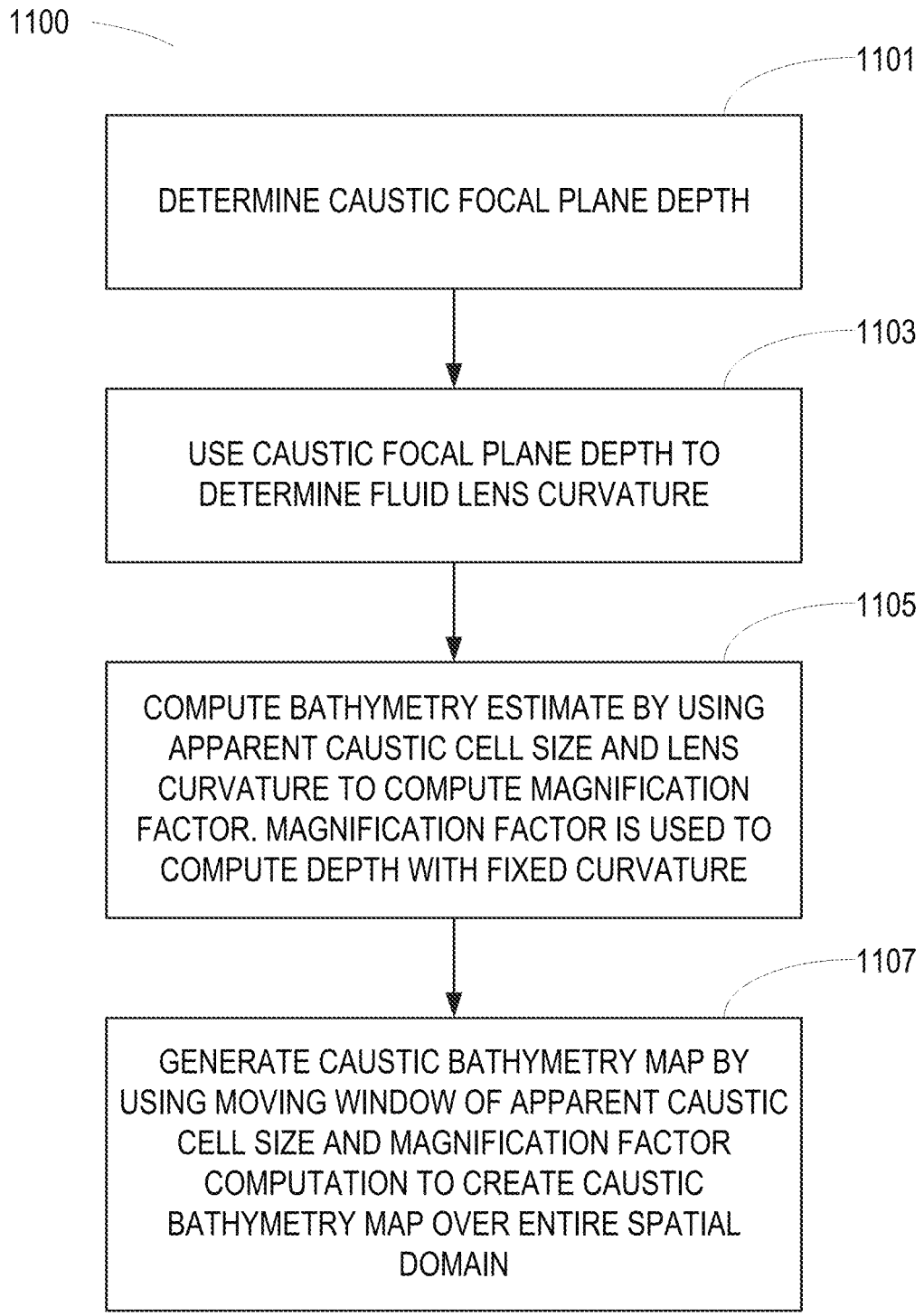

FIG. 11 is a flow diagram illustrating phase for determining the caustic bathymetry of the underwater environment observed, according to some embodiments.

Figure 12:
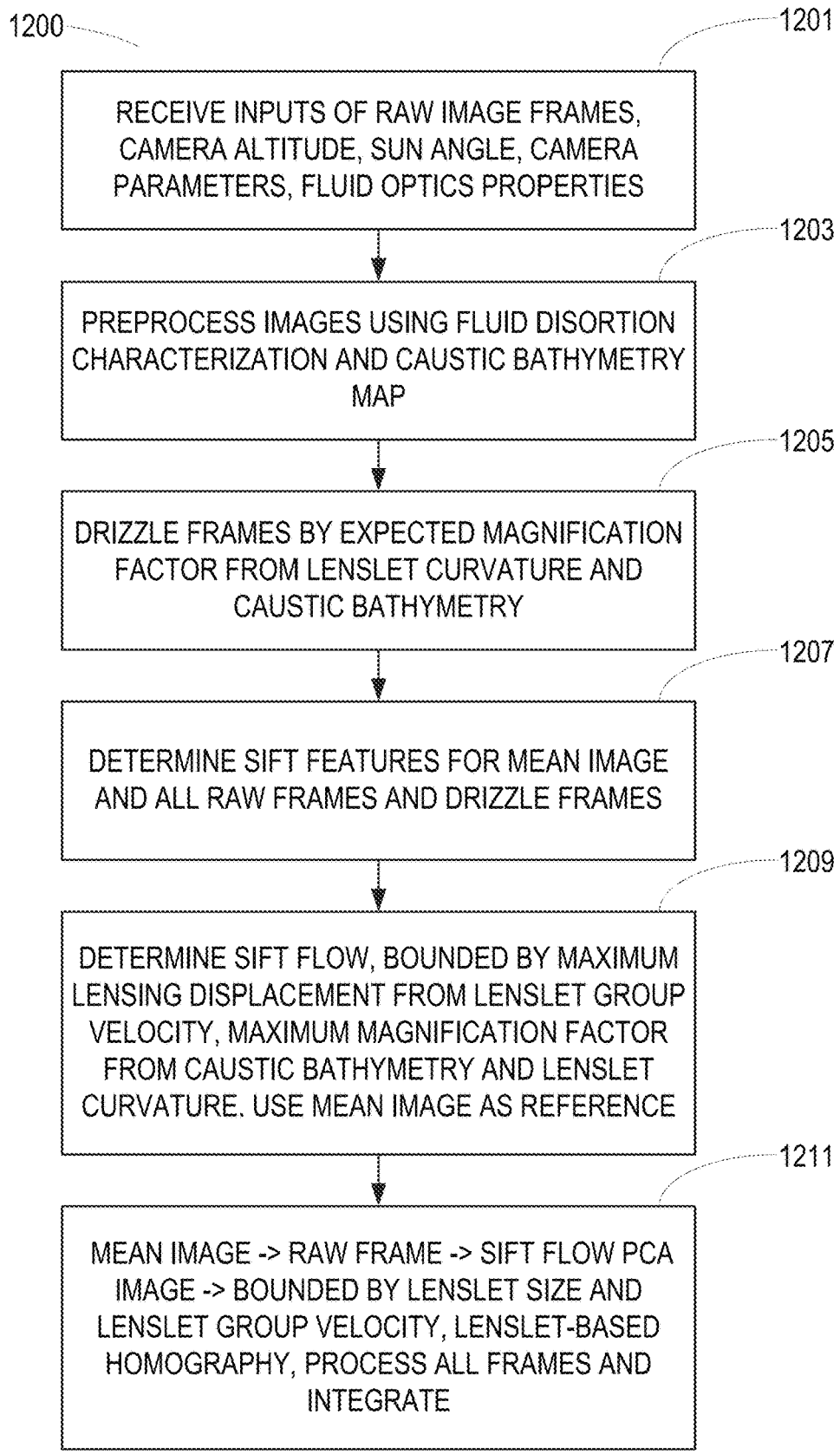

FIG. 12 is a flow diagram that illustrates the core process for two-dimensional benthic image reconstruction according to some embodiments.

Figure 13:
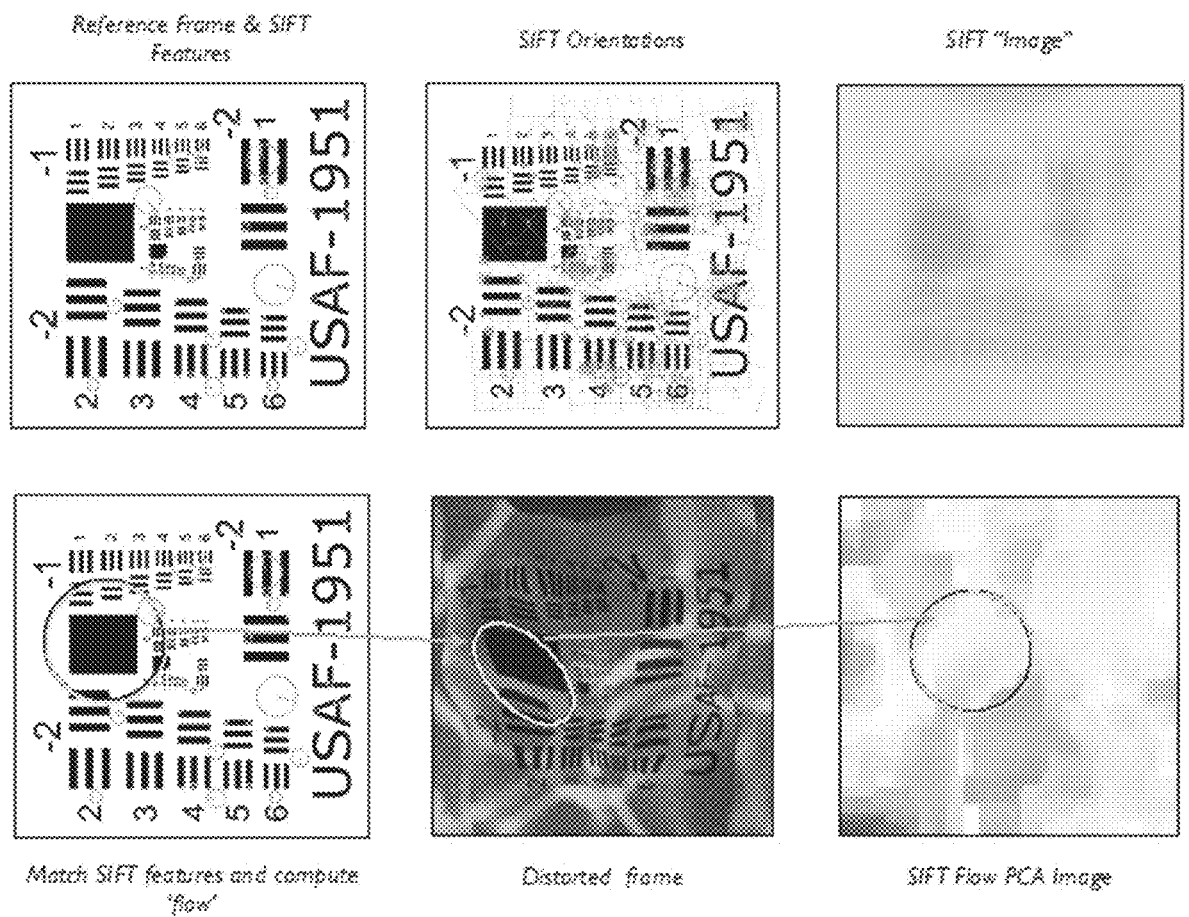

FIG. 13 is a diagram illustrating fluid lensing lenslet homography as performed using a bounded and preconditioned version of the SIFT Flow process, according to some embodiments.

Figure 14:
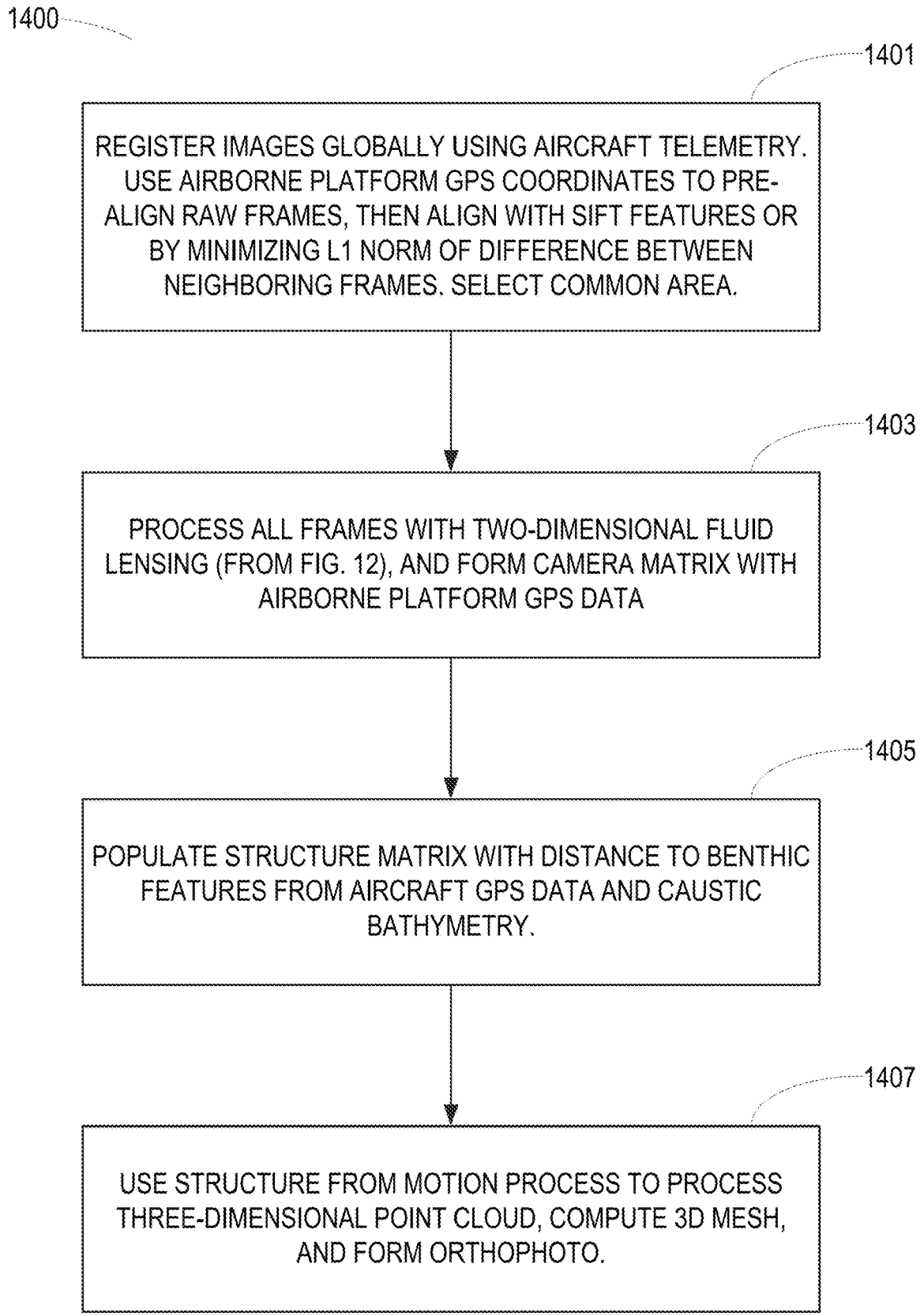

FIG. 14 is a flow diagram illustrating the 3D Airborne Fluid Lensing Process according to some embodiments.

Figure 15:
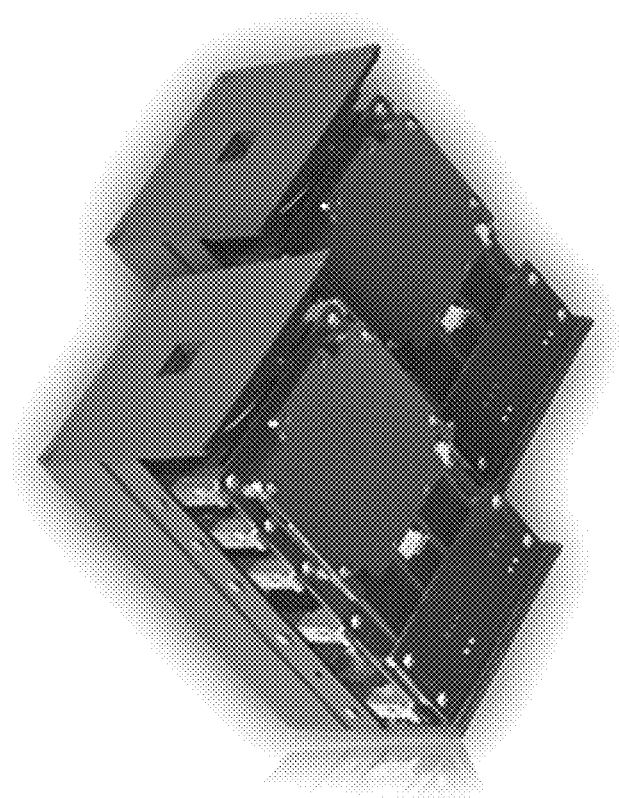

FIG. 15 illustrates examples of FluidCam integrated optical systems, imagers, and high-performance computation instruments, according to some embodiments.

The patent or application file contains at least one drawing executed in color. Copies of this patent or patent application publication with color drawing(s) will be provided by the Office upon request and payment of the necessary fee.

DETAILED DESCRIPTION OF EMBODIMENTS

In the following description, numerous specific details have been set forth to provide a more thorough understanding of embodiments of the present invention. It will be appreciated however, by one skilled in the art, that embodiments may be practiced without such specific details or with different implementations for such details. Additionally, some well-known structures have not been shown in detail to avoid unnecessarily obscuring the present embodiments.

Other and further features and advantages of the present embodiments will be apparent from the following descriptions of the various embodiments when read in conjunction with the accompanying drawings. It will be understood by one of ordinary skill in the art that the following embodiments and illustrations are provided for illustrative and exemplary purposes only, and that numerous combinations of the elements of the various embodiments of the present invention are possible. Further, certain block diagrams are not to scale and are provided to show structures in an illustrative manner. Exemplary systems and processes according to embodiments are described with reference to the accompanying figures. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Oracle Corporation of Redwood City, Calif., Microsoft® Windows®, available from Microsoft Corporation of Redmond, Wash., various versions of the Unix operating system such as Linux available from a number of vendors, various embedded operating systems, or various mobile operating systems. The method may also be implemented on a multiple-processor system, or in a computing environment including various peripherals such as input devices, output devices, displays, pointing devices, memories, storage devices, media interfaces for transferring data to and from the processor(s), and the like.

Overview

Fluid lensing can be observed over a body of water as waves cyclically distort submerged objects. Under direct sunlight, brilliant bands of light, called caustics, seem to illuminate bands at the bottom of shallower bodies of water.

All of these phenomena can be attributed to one of most basic of optical interactions between light and matter—refraction. Refraction is an optical phenomenon described by electromagnetic interactions between light and matter, and is chiefly responsible for the observations above. Embodiments of the invention focus on relationships behind optofluidic interactions occurring at the air-water boundary in planetary aquatic environments, such as rivers, lakes, and shallow marine systems on Earth.

Fluid lensing is thus the optical aberration and focusing of electromagnetic radiation by fluid media due to the combined effects of transmission, absorption, reflection, refraction, and dispersion.

Ocean wave fluid lensing is a subset of fluid lensing. In some embodiments, ocean wave fluid lensing is the optical aberration and focusing of electromagnetic radiation in visible wavelengths due to the combined effects of transmission, absorption, reflection, refraction, and dispersion by the dynamic air-seawater two-fluid interface and travelling surface waves. The important physical phenomena associated with this specialized problem include two-fluid surface wave propagation, optofluidic interactions between air and water, and the inherent optical properties of liquid water, and in particular, the air-seawater aquatic interface and the optofluidic interaction of ocean waves with visible light. Such interactions yield complex results, such as the formation of caustics on the seafloor.

Caustics are concentrated rays of light formed by refraction in an optical medium, such as water. Caustics play an important role in ocean wave fluid lensing and in the process for remote sensing that can image through ocean waves.

The air-seawater interface poses two significant challenges for observation of underwater objects from above the sea surface at high resolution. The first challenge consists of correcting for refractive distortions introduced from ocean surface waves. The second challenge consists of ameliorating the significant optical absorption of visible light in the water column. Present embodiments of the invention overcome both of these challenges to provide the high resolution and minimally distorted imaging of underwater objects.

Present embodiments are a significant improvement over the state of the art. No prior remote sensing technologies exist that can image underwater objects in the presence of surface waves with effective spatial resolutions at the centimeter scale due to distortions from ocean wave fluid lensing. Indeed, depending on ambient surface wave conditions, remote sensing even at the meter scale is problematic without significant spatial and georectification errors introduced to multispectral image data. Existing approaches for imaging through fluid media from observational astronomy, such as sensing at wavelengths undistorted by the interfering optical medium, adaptive optics, and lucky imaging, are untenable for aquatic remote sensing due to factors such as the narrow electromagnetic transmission window of liquid water, and the solar spectrum irradiance distribution.

For Earth's shallow marine systems, the lack of observational capability at the cm and meter scales has serious implications for understanding some of the Earth's most diverse, biologically productive, and economically valuable ecosystems reefs. No prior remote sensing technologies have effective spatial resolutions at the cm and meter scale over aquatic regions, hindered by ocean wave distortion and optical absorption, that are needed to detect reef changes with at least weekly temporal resolution and assess reef percent cover with better than 1-sigma accuracy.

Remote sensing of coral reef and other shallow aquatic ecosystems is characterized by measurements and determination of habitat, geomorphology, water properties, bathymetry, currents and waves. Existing airborne and spaceborne earth science technologies employ imaging spectroscopy through multispectral remote sensing (e.g., AVIRIS, HICO), multispectral imaging (e.g., Landsat 8, WorldView-2), and radar altimeters (e.g., JASON-1/2/3) to study these systems. These instruments all exploit electromagnetic radiation, typically of solar origin, within the atmospheric opacity windows of Earth's atmosphere. Absorption of certain wavelengths of light by atmospheric constituents such as water vapor, nitrogen, oxygen, and other gases and aerosols limits remote sensing across the full electromagnetic spectrum. Further, the fluid behavior of the atmosphere, such as turbulent mixing and temperature gradients introduces significant optical distortions along the optical path.

Partly as a consequence of atmospheric seeing, prior multispectral remote sensing instruments operate with effective spatial resolutions of only 0.5-30 m. Because submerged objects imaged from above the ocean surface are subject to large optical distortions from refraction at the air water interface, even remote sensing systems capable of cm-scale spatial resolutions over land may only operate over water with an effective resolution at the meter scale using prior approaches, depending on the surface wave properties.

The strong attenuation of electromagnetic radiation in water further limits passive remote sensing of Earth's aquatic systems, often limiting passive multispectral remote sensing to depths of 100 meters and shallower, with limited spectral range. In the context of high-resolution remote aquatic sensing in shallow marine environments, absorption also plays a significant role in limited the available signal-to-noise ratio (SNR) of images. This is the second challenge of high-resolution aquatic remote sensing addressed by embodiments of the invention.

With typical reef accretion rates ranging from 1-14 mm per year for corals to ~1 mm per year for modern stromatolites, traditional underwater surveys, photogrammetry and acoustic bottom mapping technologies remain the primary means to study reef ecosystems at the cm-scale, but are limited in spatial coverage to regions of approximately 100 $m^2$. Consequently, shallow aquatic ecosystems remain poorly surveyed by modern remote sensing methods at the cm-scale over regional areas. In some present embodiments of the invention, airborne fluid lensing is a remote sensing technology capable of imaging underwater marine ecosystems over regional scales from above the ocean's surface at the centimeter scale, in three dimensions, providing a way to observe the reef accretion year after year.

Figure 1:
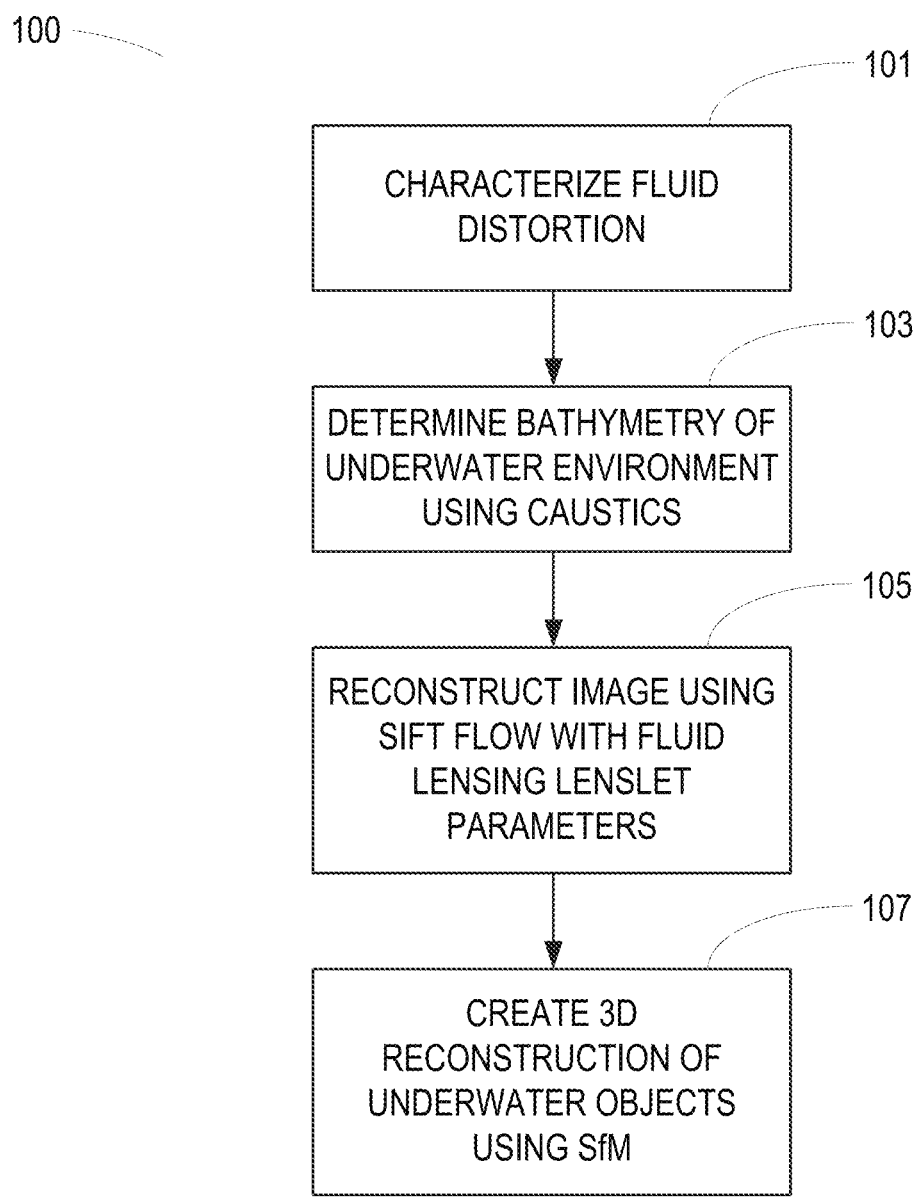
FIG. 1 is a flow diagram showing process for performing remote sensing using fluid lensing, also referred to as the fluid lensing process, according to some embodiments.

FIG. 1 is a flow diagram showing process 100 for performing remote sensing using fluid lensing, also referred to as the fluid lensing process, which utilizes high-frame-rate multispectral remote sensing data to remove ocean wave distortions from an image, to enhance the resolution of an image by exploiting ocean waves, and to enhance the signal strength of an image otherwise impaired by optical absorption in the water column, according to some embodiments. While FIG. 1 describes some embodiments at a high level of detail, additional details are further described below.

At step 101, fluid distortion caused by the surface properties of the fluid is characterized in a first phase of the process. In some embodiments, the distortion is characterized based on the spatial locations of caustic focal planes, caustic cell size, lenslet spatial periodicity, and lenslet group velocity. In some embodiments, the process further determines the spatial location of the bathymetric feature closest to the caustic focal plane of the fluid lensing lenslets, and the pixel intensities are analyzed to identify sharply focused caustics.

At step 103, the bathymetry of the underwater environment is determined using caustics. At step 105, a high-resolution (<cm) underwater image is reconstructed by tracking and exploiting ocean wave fluid lensing lenslets. The reconstruction is based on preconditioning and bounding scale-invariant feature transform flow (SIFT flow) using fluid lensing lenslet parameters, and creating two-dimensional orthorectified image reconstructions of submerged environments, substantially without wave distortion from the fluid interface.

In some embodiments, a further step is performed at step 107 to create a three-dimensional reconstruction of underwater objects by using a Structure from Motion (SfM) process.

According to some embodiments, unmanned aerial vehicles (UAVs) may be used for imaging the underwater environments in real-world shallow marine environments of high scientific value, such as reef ecosystems.

In some embodiments, ocean waves and fluid lensing are modeled in a test pool simulation to determine fluid lensing characteristics through ocean wave synthesis, bidirectional optical ray-tracing, image processing, computer vision, and signals processing. In some embodiments, a generalized toolset is developed for simulation of optical coupling of arbitrary fluid-interfaces and optical detection and image processing of optofluidic interactions.

In some embodiments, an underwater image quality assessment is performed, and error metrics are determined by signal-to-noise quantification.

In some embodiments, the images and video inputted into fluid lensing process uses high-frame-rate multispectral instruments, including using existing multispectral remote sensing instruments, such as NASA's current fleet of 25 Earth Science satellites, which are a part of the Earth Observing System (EOS), as well as either a piloted and an unmanned airborne science fleet. Accordingly, this process does not require additional hardware be retrofit to existing multispectral instruments.

In some embodiments, remote sensing with fluid lensing uses high sampling and data rates for reconstruction, and is not immediately applicable to all existing multispectral instruments. In some embodiments, the high sampling and data rates are achieved using a new fluid lensing instrument called FluidCam.

In some embodiments, process 100 of FIG. 1 can be applied to environments other than shallow reefs, such as environments present on Saturn's moon Titan, composed of liquid hydrocarbon lakes, or deep-sea 3D imaging of hydrothermal 'smoker' vents on Earth, which are typically obscured by strong fluid refractive distortions.

Modelling of Fluid Lensing Effects

In some embodiments, fluid lensing effects are first computationally modelled using geometric optics approximation, water's inherent optical properties, a Fourier domain ocean wave synthesis, and bidirectional path-tracing solutions to the render equation. The dominant physical interactions causing fluid lensing include optical phenomena, such as electromagnetic wave refraction, reflection, absorption, and dispersion, as well as aquatic surface wave phenomena, such as ocean wave propagation and frequency spectra. The fluid lensing image reconstruction process is based on modelling of these phenomena, developing an analytic theory, and creating a processing pipeline developed from modern computer vision methods and signals processing.

Maxwell's field equations relate the electric field, magnetic field, current density, charge density, permittivity of free space, and permeability of free space through a set of coupled first-order partial differential equations:

$$\nabla \cdot D = \rho$$

$$\nabla \cdot B = 0$$

$$\nabla \times E = -\frac{\partial B}{\partial t}$$

$$\nabla \times H = J + \frac{\partial D}{\partial t}$$

where: D, the electric displacement, is given by the constitutive relation $D=\varepsilon_0 E+P$; E is the electric field, $\varepsilon_0$ is the permittivity of free space, and P is the polarization of the medium; B, magnetic field, is given by the constitutive relation $B=\mu_0 H+M$; H is the magnetic field intensity, $\mu_0$ is the permeability of free space; and M is the magnetization of the medium. Simplifying these constitutive relations by ignoring polarization and magnetization of media and considering propagation in free space are shown as follows:

$$\nabla \cdot E = 0$$

$$\nabla \cdot B = 0$$

$$\nabla \times E = -\frac{\partial B}{\partial t}$$

$$\nabla \times B = \mu_0 \varepsilon_0 \frac{\partial E}{\partial t}$$

This set of first-order, coupled, partial differential equations can be shown to describe a single decoupled second-order differential equation that governs the propagation of light. By using the following substitution:

$$\nabla \times (\nabla \times E) = \nabla \times \left(-\frac{\partial B}{\partial t}\right) = -\frac{\partial}{\partial t}(\nabla \times B)$$

and vector identity: $\nabla \times (\nabla \times E) = \nabla(\nabla \cdot E) - \nabla^2 E$, with $\nabla \cdot E = 0$, the electric field is expressed as:

$$\nabla^2 E = \mu_0 \varepsilon_0 \frac{\partial^2 E}{\partial t^2}$$

and, by similar substitution, the magnetic field is expressed as:

$$\nabla^2 B = \mu_0 \varepsilon_0 \frac{\partial^2 B}{\partial t^2}$$

These second-order partial differential equations are of the generic form of the three-dimensional wave equation, $$\nabla^2 f(r, t) = \frac{1}{v^2} \frac{\partial^2 f(r, t)}{\partial t^2},$$

where v is the phase velocity of the wave, and f(r, t) is the scalar wave amplitude. From substitution into this generic three-dimensional wave equation, the phase velocity of an electromagnetic wave is given by $$v = \frac{1}{\sqrt{\mu \varepsilon}}.$$

in a vacuum, $$v = \frac{1}{\sqrt{\mu_0 \varepsilon_0}} = c = 2.998 * 10^8 \text{ m/s}.$$

In a uniform, homogeneous, isotropic, non-dispersive $$\left(\frac{\partial \mu}{\partial \omega} = 0, \frac{\partial \varepsilon}{\partial \omega} = 0\right)$$

linear optical medium, free from charge ($\rho=0$), these field equations can be simplified as:

$$\nabla \cdot E = 0$$

$$\nabla \cdot B = 0$$

$$\nabla \times E = -\frac{\partial B}{\partial t}$$

$$\nabla \times B = \mu\varepsilon\frac{\partial E}{\partial t}$$

and the corresponding wave equations describing the complementary electric and magnetic fields are $$\nabla^2 E = \mu\varepsilon\frac{\partial^2 E}{\partial t^2} \text{ and } \nabla^2 B = \mu\varepsilon\frac{\partial^2 B}{\partial t^2}.$$

The phase velocity of an electromagnetic wave through a linear medium is thus $$v = \frac{1}{\sqrt{\mu\varepsilon}} = \frac{c}{n},$$

where $\eta$, the index of refraction, is given by $$n = \sqrt{\frac{\mu\varepsilon}{\mu_0\varepsilon_0}}.$$

For most materials, $\mu \approx \mu_0$, so $n \approx \sqrt{\varepsilon_r}$, where $$\varepsilon_r = \frac{\varepsilon}{\varepsilon_0}$$

is the dielectric constant of the material.

The general solution to these electromagnetic wave equations is a linear superposition of waves of the form:

$$E(r,t)=g(\omega t-k\cdot r)$$

$$B(r,t)=g(\omega t-k\cdot r)$$

where g is a well-behaved function, typically a monochromatic sine wave, $\omega$ is the angular frequency, t is time, k is the propagation vector or wave vector, and r is the position vector. The simplest solution to the wave equations is the simple harmonic plane wave:

$$E(r,t)=E_0 e^{i(\omega t-k\cdot r)}$$

$$B(r,t)=B_0 e^{i(\omega t-k\cdot r)}$$

Substitution of this solution back into the wave equations yields $$\mu\varepsilon\frac{\partial^2 E}{\partial t^2} = -\omega^2\mu\varepsilon E,$$

and thus $k=\omega\sqrt{\mu\varepsilon}$, which relates the wave vector to the frequency—otherwise known as the dispersion relation. This dispersion relation describes the phenomenon observed for waves travelling through media for which the wave speed is a function of its frequency. The concept of dispersion also applies to ocean waves, as discussed in the following section and is generalized to other wave phenomena as well. In the case of light waves, it can further be shown that the wave vector k, electric field E, and magnetic field B are all mutually orthogonal to each other, such that and E and B propagate in phase and $k \times E = \omega B$.

The electromagnetic description of light as described in the preceding section is sufficient to describe the optical phenomena of reflection, transmission and refraction across matter with different values of $\mu$ and $\varepsilon$. Considering the plane harmonic wave described previously, incident on two different optical media with refractive indices $n_i$ and $n_t$, incident wave $E_i$, reflected wave $E_r$, and refracted transmitted wave $E_t$ are expressed as follows:

$$E_i(r,t) \propto e^{i(\omega t - k_i \cdot r)}$$

$$E_r(r,t) \propto e^{i(\omega t - k_r \cdot r)}$$

$$E_t(r,t) \propto e^{i(\omega t - k_t \cdot r)}$$

For continuous solutions across the interface, the phase $\phi=\omega t-k\cdot r$, of all three wave equations must be equal at the interface. From this requirement, it can be shown by vector decomposition that $$k_x^i = \left(\frac{n_t}{n_i}\right)k_x^t,\ k_y^i = \left(\frac{n_t}{n_i}\right)k_y^t,$$

$k_x^i=k_x^r$ and $k_y^i=k_y^r$. These relationships indicate that both the transmitted and reflected waves lie in the same plane as the incident wave. Thus, in the plane of incident:

$$k_x^i=\sin(\theta_i),\ k_y^i=0,\ k_z^i=\cos(\theta_i)$$

$$k_x^r=\sin(\theta_r),\ k_y^r=0,\ k_z^r=\cos(\theta_r)$$

$$k_x^t=\sin(\theta_t),\ k_y^t=0,\ k_z^t=\cos(\theta_t)$$

Combined with $k_x^i=k_x^r$, this yields the law of reflection, $\theta_i=\theta_r$, and with $$k_x^i = \left(\frac{n_t}{n_i}\right)k_x^t,$$

this yields Snell's Law of refraction, $n_i \sin(\theta_i)=n_t \sin(\theta_t)$. A unique consequence of this relation occurs when light travels from $n_i$ to $n_t$ and $n_i>n_t$. At the critical angle, $$\theta_c = \sin^{-1}\left(\frac{n_t}{n_i}\right),$$

the transmitted light ray has $\theta_t=\pi/2$, and travels along the interface. Beyond this critical angle, total internal reflection occurs, visible in reflection at bottom of the water surface.

For the ocean wave fluid lensing phenomenon, this description of reflection and refraction is sufficient to model the dominant lensing effects experienced by a light ray propagating through the air-water interface.

In addition to reflection and refraction, some embodiments of the invention are based on a model of absorption of light in a medium through empirical measurements of optically pure water. Absorption in the optical medium of water is a complex wavelength-dependent process involving rotational transitions, vibrational transitions, and electronic transitions in the water molecule. Derivation of the absorption spectrum of water from first principles is not feasible at present, and some embodiments use prior empirical measurements of absorption of water for modeling of ocean wave fluid lensing. However, should the absorption spectrum of water from first principles becomes feasible, some embodiments of the invention may use such derivation without departing from the spirit of the invention.

The Beer-Lambert law relates the attenuation of light to its optical depth. The optical depth $\tau$ is defined as:

$$\tau = \ln\left(\frac{\phi_e^i}{\phi_e^t}\right) = -\ln(T)$$

where $\Phi_e^i$ is the incident radiant flux, $\Phi_e^t$ is the radiant flux transmitted by the material, and T is the transmittance. The transmittance is then related to the absorption coefficient $\mu$ and optical path length l by the relationship $T=e^{-\int_0^l \mu(z)dz}$. According to some embodiments, the absorption coefficient $\mu$ is given in units of $$\left[\frac{1}{\text{cm}}\right].$$

According to some embodiments, properties of optically pure liquid water at standard temperature and pressure is used for the fluid lensing process. Water strongly attenuates electromagnetic energy and has unique spectral absorption features in the visible wavelengths.

The values of $\mu$ and $\varepsilon$ are also functions of wavelength in water. Consequently, the refractive index of water is a function of wavelength. This dispersive property of water is responsible for the rainbow-like banding visible in caustics at depth.

Geometric Optics Approximation

Geometric optics approximation is a simplification of the full electromagnetic theory of light propagation that describes light in terms of rays obeying only basic laws of refraction, reflection, and absorption. Light rays can thus be effectively "traced" uniquely from their origin through geometric boundary conditions and refractive indices alone. Such ray-tracing satisfies the following properties:
1. Light rays propagate in rectilinear paths through homogenous media.
2. Lights rays refract according to Snell's law.
3. Light rays follow curved paths in media with changing refractive index.
4. Light rays may be absorbed or reflected.

Notably, geometric optics does not consider the wave nature of light and associated properties of diffraction, interference, polarization, scattering, or other behavior. However, this approximation allows for quick modeling of lenses, geometric and chromatic aberrations, and optical design, according to some embodiments.

In some embodiments, geometric optics and ray-tracing are useful tools for modeling the behavior of surface wave interactions with light. Caustics, for example, may be described and modelled as the focusing effect of surface waves. Some embodiments of the invention model this behavior for dynamic fluid surfaces. The numerical simulation, the formulation of the render equation, and the implementation of advanced ray-tracing techniques used is further described herein.

Ocean wave fluid lensing effects are the consequence of electromagnetic interactions occurring at the air-water boundary and the geometry of aquatic waves. The optical equations describing these interactions and the simplification to geometric optics and ray-tracing were discussed previously. Accurate modelling of the boundary conditions and surface geometries of the air-water interface in the context of fluid dynamics, ocean waves, and surface wave simulation is also desired, in particular, methods for accurately simulating ocean waves generating surface meshes for optical coupling using the superposition of multiple periodic functions in the spatial domain and Fourier domain. In some embodiments, the Fourier domain ocean wave synthesis method developed by Tessendorf is used for simulation of the ocean wave fluid lensing phenomenon.

Modelling Motion for Fluids

The Navier-Stokes equations govern the motion of classical fluids and were formulated in the 1800s. The conservation of mass, momentum, and energy over a control volume can be shown to yield the coordinate-independent differential form of the equations of motion for a fluid element:

$$\frac{\partial \rho}{\partial t} + \nabla \cdot (\rho U) = 0$$

$$\frac{\partial (\rho U)}{\partial t} + \nabla \cdot (\rho U \otimes U) + \nabla P - \rho G - \nabla \cdot \bar{\tau} = 0$$

$$\frac{\partial \rho (e+k)}{\partial t} + \nabla \cdot (\rho(e+k)U + PU - \bar{\tau} \cdot U + Q) - \rho G \cdot U = 0$$

where $\rho$ is the density, t is time, U is the velocity of the flow, P is the pressure, G is the sum of body force vectors, $\bar{\tau}$ is the stress tensor, e is the internal energy per unit mass of the medium, k is the kinetic energy per unit mass, and Q is the conductive heat flux.

Aquatic surface waves are fully described by the Navier-Stokes equations, but for the purposes of modelling fluid lensing according to some embodiments, a geometrical description for the geometry of the fluid surface of the air-water interface is sufficient to characterize the dynamical behavior of lensing caused by surface waves. For ocean waves, the refractive index difference between air and water is many orders larger than the typical refractive index changes that occur in the water column due to gradients in temperature and salinity, such as thermoclines and haloclines. Thus, modelling the surface wave field and optical absorption is considered sufficient to model the ocean wave fluid lensing phenomenon to first order, according to some embodiments.

Ocean waves propagate in a viscous fluid over an irregular benthic topography with varying permeability. The equations of motion for such surface waves are fully described by the Navier-Stokes equations. However, direct numerical solutions to the Navier-Stokes equations over such large domains and small scales are still intractable. Fortunately, the viscous boundary layers formed at the fluid surface due to interactions with wind, and the analogous layers formed due to the interaction with benthic topography are thin. As such, in most cases, the main body of the fluid motion is nearly irrotational. Further, liquid water is largely incompressible. Accordingly, with these approximations, a velocity potential and a stream function are expressed for waves.

Considering waves of infinitesimal amplitude, in an inviscid and incompressible fluid, the velocity potential, as given by $U=\nabla\Phi$, is governed by the wave equation:

$$\nabla^2 \Phi = \frac{1}{c^2} \frac{\partial^2 \Phi}{\partial t^2}$$

where $c=\sqrt{dp/d\rho}$ is the speed of sound, t is time, and $\Phi$ is the velocity potential.

Considering only gravity as a body force with these approximations, the linear theory of ocean waves gives the sea-surface elevation, $\eta$, as:

$$\eta = A^* \sin(kx - \omega t)$$

where the amplitude, A, is small, the angular frequency, $\omega$, is related to the frequency, f, and period T by $$\omega = 2\pi f = \frac{2\pi}{T},$$

and the wave number, k, is related to the wavelength $\lambda$ by $$k = \frac{2\pi}{\lambda}.$$

This can be shown to yield a simplified dispersion relation for ocean waves as a function of depth:

$$\omega^2 = (gk \tan h(kd))$$

where d is the water depth, and g is the acceleration due to gravity.

According to some embodiments, the shallow-water dispersion relation is relevant. In this case, where d<<$\lambda$, kd<<1, and tan h(kd)=kd, the ocean wave dispersion relation reduces to $\omega = k\sqrt{gd}$ for cases where the depth is approximately $$d < \frac{\lambda}{10}.$$

The phase velocity, $$c = \frac{\omega}{k},$$

in this shallow-water case is then given by $c=\sqrt{gd}$. In the case of deep water, where d>>$\lambda$, kd>>1, and tan h(kd)=1, the dispersion relation reduces to $\omega=\sqrt{gk}$.

Ocean Wave Synthesis with Fourier Domain Methods

Ocean waves are readily characterized by the concept of a wave spectrum. Fourier showed that nearly any function, e.g. the sea-surface elevation, $\eta(x, y)$, can be represented as the sum of an infinite series of periodic functions with harmonic wave frequencies. The wave-height spectrum, then, is given by the Fourier transform of $\eta(x, y)$ over a period of time. The wave-energy spectrum is similarly generated by incorporating wave energy into the wave height spectrum.

According to some embodiments, Fourier domain synthesis of ocean surface waves is used for simulation of the ocean wave fluid lensing phenomenon. The Fourier domain ocean wave synthesis provides a time-dependent wave-height field mesh, which is coupled to the optical properties of water, and solved using optofluidic coupling methods described in the next section.

According to some embodiments, the ocean surface height field h(x, t) is represented as the sum of periodic functions such that:

$$h(x, t) = \sum_k \tilde{h}(k, t) e^{ikx}$$

where k is the wave number, k is the wave vector, T is the wave period, A is the wavelength, h is the height of the water, x is the spatial position of the simulation point, t is time, g is the gravitational constant, $P_k$ is the Phillips spectrum, $\xi$ is an independent draw from a Gaussian random number generator with $\mu=0$ and $\sigma=1$, L is the largest permissible wave arising from a given wind speed, $\omega$ is the angular frequency, and w is the wind direction.

The set of complex Fourier amplitudes and initial phase values at t=0, is defined by the following expression:

$$\tilde{h}_o(k) = \frac{1}{\sqrt{2}} (\xi_r + i\xi_i) \sqrt{P_h(k)}$$

where initial parameters are taken from a Gaussian random number generator, $\xi_i$, and $P_h(k)$ is the Phillips spectrum, commonly used to characterize wind-driven waves. The Phillips spectrum characterizes the spectral and statistical properties of the equilibrium range of wind-generated gravity waves and is generated by the following expression, put forth by Phillips.

$$P_h(k) = \frac{A|\hat{k} \cdot w|^2 e^{-\frac{1}{(kL)^2}}}{k^4}$$

Taking the simplified deep-water dispersion relation, $\omega=\sqrt{gk}$ into this relation, the Fourier domain wave amplitudes at time t are:

$$\tilde{h}(k,t) = \tilde{h}_0(k) e^{i\omega(k)t} + \tilde{h}_0^*(-k) e^{-i\omega(k)t}$$

with $\tilde{h}^*(k,t)=\tilde{h}(-k,t)$, this expression has the valuable property that t can be determined at any timestep without solving for all t. According to embodiments, Blender®, available from The Blender Foundation, has integrated this Fourier domain ocean wave synthesis method into an open-source computer graphics render engine, and is used to generate ocean wave fields, according to embodiments. An example of an ocean surface wave mesh generated using this technique is shown in FIG. 2.

Modelling Optofluidic Interactions

The ocean surface wave mesh generated by the method presented above is used with water's optical properties to model accurate optofluidic interactions, according to some embodiments. In computer graphics, the rendering equation is an integral equation, in which the equilibrium radiance leaving a point $L_o(x,\omega_o,\lambda,t)$ is given as the sum of emitted-plus-reflected radiance under a geometric optics approximation. Render engines seek to numerically solve the render equation using a number of ray tracing paths and sampling techniques, called importance sampling. However, the generalized render equation being approximated is common across all unbiased engines and given by:

$$L_o(x,\omega_o,\lambda,t) = L_e(x,\omega_o,\lambda,t) + \int_\Omega f_r(x,\omega_i,\omega_o,\lambda,t) L_i(x,\omega_i,\lambda,t) (\omega_i \cdot n) d\omega_i$$

where λ is the wavelength of a light ray, t is time index, x is the spatial location, n is the surface normal at the spatial location, $\omega_o$ is the direction of outgoing light, $\omega_i$ is the direction of incoming light, $L_o$ is the integrated spectral radiance at wavelength), directed outward along direction $\omega_o$ from x at time t. $L_e$ is the emitted spectral radiance. $f_r$ (x, $\omega_i$, $\omega_o$, λ, t) is the bidirectional reflectance distribution (BRDF), and $L_i$ is the spectral radiance toward x along $\omega_i$. Ω is the unit hemisphere centered around n, encompassing all values of $\omega_i \cdot (\omega_i \cdot n)$ is Lambert's cosine law.

According to some embodiments, bidirectional path tracing and sampling methodology, called Metropolis Light Transport, which is a special form of ray tracing, is used to render the dominant physical phenomena associated with ocean wave fluid lensing, such as wavelength-dependent refraction, reflection, absorption, and the formation of caustics.

Bidirectional path tracing is an advanced light transport process that expands upon single path tracing solutions to the render equation. Single path tracing solutions to the render equation typically trace light rays from the camera, and, consequently, require increased sampling to properly render indirect lighting. Bidirectional path tracing, however, handles arbitrary materials and meshes, and is more efficient at rendering indirect lighting effects. The method relies on rendering subpaths from the light sources in a scene as well as subpaths from the camera. These properties make bidirectional path tracing, when coupled with the appropriate sampler, efficient at rendering complex lighting, including secondary reflections, diffuse reflections, and caustics.

In order for bidirectional path tracing to efficiently render a scene with complex lighting, such as a scene subject to ocean wave fluid lensing, an advanced importance sampling method is also used, beyond pseudo-random and random Monte Carlo sampling techniques. The Metropolis Light Transport (MLT) process, based on the Metropolis-Hastings process and is a Markov chain Monte Carlo method, is used for rapid convergence of complex lighting scenes.

Beyond converging complex features such as caustics quickly, the MLT process benefits from being an unbiased method. An unbiased rendering method does not introduce any systematic error, or bias, in solutions to the render equation. This important property also allows solutions to the render equation to behave in an analogous fashion to the noise properties of a remote sensing instrument and photon shot noise. Namely, samples are approximately Poisson distributed in intensity.

According to some embodiments, MLT process convergence is used to simultaneously simulate ocean wave fluid lensing as well as to simulate the optical and sensor noise properties of a real-world multispectral instrument.

Image Reconstruction Process

The fluid lensing image reconstruction process is based on modern signals processing methods, coupled to the analytic theoretical framework. According to some embodiments, the process is based on the statistical properties of ocean waves, multispectral image processing methodology, and computer vision methodology.

Signals processing methods used in some embodiments include one-dimensional signals processing methods, such as the discrete Fourier transform (DFT), numerical methods, such as gradient ascent optimization, two-dimensional (2D), or image processing methods, such as the image gradient, 2D DFT, and computer vision methods, such as the scale-invariant feature transform (SIFT) detector, SIFT flow, and structure from motion (SfM).

According to some embodiments, signals (1D) and image processing (2D) methods are used. In some embodiments, 1D signals processing is primary performed on time-dependent values and is analyzed in the frequency domain by using a discrete Fourier transform (DFT). The 1D DFT of a function with N samples is defined by:

$$F[k] = \frac{1}{N}\sum_{n=0}^{N-1} f[n]e^{-2\pi i \left(\frac{k}{N}n\right)}$$

Similarly, for an M×N dimension grayscale image matrix, the 2D DFT is defined by:

$$F[k,l] = \frac{1}{MN}\sum_{m=0}^{M-1}\sum_{n=0}^{N-1} f[m,n]e^{-2\pi i \left(\frac{k}{M}m+\frac{l}{N}n\right)}$$

The image gradient, ∇I, computes the spatial gradients of an M×N grayscale image along the x and y directions and forms a gradient image of size M×N by the operator:

$$\nabla I = \begin{bmatrix} \frac{\partial I}{\partial x} \\ \frac{\partial I}{\partial y} \end{bmatrix}$$

According to some embodiments, with further reference to FIG. 1 and the fluid lensing process, a numerical method that is used in step 103 in determining bathymetry of underwater environment using caustics is the gradient ascent method. Given a multivariable function F(x), defined and differentiable in the neighborhood of a point a, the local maximum, b, can be found by taking iterative steps, γ, toward the direction of positive gradient, such that:

$$b = a + \gamma \nabla F(a)$$

This method is applied to 2D images in the caustic cell size determination. While this method does not find global maxima, some embodiments of the present invention use Monte-Carlo sampling to calculate multiple path lengths and determine a maximum from the set.

Additional image processing methods used according to some embodiments include the 2D median filter to remove specular noise from the rendering process. The 2D median filter computes the median pixel intensity value in a pre-defined kernel size in the neighborhood of a pixel to generate a median image. The mean image and median image are used as references for the 2D fluid lensing process. The mean image and median image include the mean or median value of a pixel across all the frames in the test pool rendering. Finally, pixel interpolation, namely bicubic interpolation, is used in the final image integration as part of a process called drizzling, which enables higher spatial sampling of an image with multiple aligned subsampled images. Subsampled images are aligned at the sub-pixel level and interpolated before being integrated together using a mean image operation.

Scale-Invariant Feature Transform (SIFT)

According to some embodiments, the 2D fluid lensing methodology uses a computer vision transform called the Scale-Invariant Feature Transform (SIFT) to detect and describe features in an image which are invariant to scale changes and robust to certain affine and non-affine image transformations, as well as illumination changes. According to some embodiments, SIFT is used to detect and describe features in image and is modelled on biological vision systems and empirically measured responses of visual systems to angles, among other features. In some embodiments, SIFT creates a 128-dimensional description of a feature in an image, detected by the following methodology.

First, the scale-space extrema of an image are found using a difference of Gaussian filter. Second, detected keypoints are localized and filtered. Finally, a 4×4×8 descriptor is created using a 4×4 gradient window in 8 angular directions with Gaussian weighting around the center. FIG. 3 illustrates the SIFT keypoint detector and feature matching using Euclidean distance and filtering by a geometric mapping solved by random sample consensus (RANSAC), according to some embodiments. The robustness of SIFT descriptors to strong image transformations and scale-invariance makes SIFT useful for embodiments of the present invention, especially as compared to Harris-Laplacian keypoint detection and Features from Accelerated Segment Test (FAST) detectors.

SIFT Flow

Tracking the movement of objects across multiple image frames, or a video, has been studied extensively in computer vision and many processes exist that attempt to mimic biological systems in their ability to robustly track an object undergoing an image transformation, or an apparent or physical displacement. Optical flow, for example, is a methodology that uses a three-dimensional feature vector, consisting of red, green, and blue intensity patterns between pixels in a neighborhood between image frames, to determine displacement of a point between neighboring frames. While such methods work well to compute displacement in the case of constant illumination and fixed projection, they are not robust to variations of scale, illumination and transformation across time.

In an attempt to ameliorate tracking of objects between frames undergoing scale, illumination, and transformation, SIFT Flow was developed. SIFT Flow uses 128-dimensional SIFT descriptors as feature vectors for optical flow instead of three-color intensity feature vectors. This methodology offers the potential for robust feature tracking under scale, illumination, and affine transformation over time, but increases the computational cost and complexity as compared to optical flow. In SIFT Flow, dense SIFT descriptors are computed on the pixel scale for all images to form SIFT images. Given two such images, $s_1$ and $s_2$, SIFT flow solves for the flow vector, $w(p)=(u(p), v(p))$, which minimizes the SIFT Flow energy function $E(w)$:

$$E(w) = \sum_p \min(\|s_1(p) - s_2(p + w(p))\|_1, t) + \sum_p \eta(|u(p)| + |v(p)|) + \sum_{(p,q)} \min(\alpha|u(p) - u(q)|, d) + \min(\alpha|v(p) - v(q)|, d)$$

where t and d are thresholds, $\eta$ is the small displacement term, and a is the smoothness term. With 128-dimensional feature vectors and no restriction on where features may be spatially located, however, SIFT Flow has a high computational overhead for minimizing the energy function. To address this, the authors of SIFT Flow implement dual-layer loopy belief propagation to decouple the horizontal flow and vertical flow components in the SIFT Flow energy function optimization to reduce process complexity and incorporate a coarse-to-fine matching scheme which iteratively estimates the flow from a coarse level to a fine level approaching the pixel scale.

In some embodiments, this coarse-to-fine matching scheme is preconditioned by fluid lensing lenslet parameters, and bounded by predicted displacements and magnifications of lenslets.

According to some embodiments, another computer vision technique is used in the 3D airborne fluid lensing process, 3D reconstruction by Structure from Motion (SfM). SfM is a method of projective reconstruction from multiple uncalibrated images, like those captured from an airborne platform, for example. Analogous to SIFT, the development of SfM was motivated by the biological phenomenon of depth perception from the retinal motion field of a moving object or scene. SfM formulates this problem mathematically as the factorization of one matrix, containing all image points of all views. By solving for the camera matrix using the intrinsic properties of the imaging system and knowing the position and angle from which images were taken, the structure matrix of a near-field object can be solved to determine the distance to image pixels in a scene. According to embodiments, in the case of airborne remote sensing, aircraft telemetry is used to collect data for use by SfM.

In some embodiments, SfM is used to determine the 3D structure of an underwater environment after the 2D Fluid Lensing Process removes the distortions associated with ocean waves and generates multiple 2D views of a benthic scene. Recent advances in highly-parallelized solutions to the SfM matrix factorization using Graphical Processing Units (GPUs) suggest SfM may present a viable alternative to LiDAR-based elevation modelling from airborne platforms. The application of SfM to techniques for remote sensing using fluid lensing is further discussed below.

Example: Fluid Lensing Process in Test Pool Simulation

The following describes an example of the remote sensing technique using fluid lensing as used in a test pool simulation, according to some embodiments. In this example, the ocean wave fluid lensing phenomenon is modelled using a Fourier-domain ocean wave synthesis process, based on the Phillips spectrum, coupled with water's empirically-determined optical properties, and rendered with unbiased optical ray-tracing solutions to the render equation, modelling multispectral light transport, reflection, refraction, absorption, and dispersion. A test pool simulation is constructed using the aforementioned modelling scheme and consists of image quality assessment and color resolution test targets, bathymetry features, three-dimensional coral-textured objects, and two-dimensional coral-textured objects. The test pool is designed to explore the ocean wave fluid lensing phenomenon in a controlled simulation environment, where the ocean surface displacement, ambient illumination conditions, and optical water properties are known precisely. Furthermore, the test pool allows for quantitative validation and error analysis of the process for remote sensing using fluid lensing, and is rendered at sub-cm scale (2.5 mm) resolution with complex optical phenomena over a large computational domain (10 m×4.5 m) in 16-bit color. Simulation of the test pool was performed on the NASA Ames Research Center Pleiades Supercomputer through the NASA Earth Exchange (NEX) and represents over 500,000 CPU core-hours of computational time.

In some embodiments, remote sensing using fluid lensing employs physical models and representations developed for ocean wave fluid lensing. The remote sensing using fluid lensing process consists of four primary phases characterization of fluid distortion, determination of bathymetry of underwater objects using caustics, two-dimensional reconstruction images using SIFT Flow with fluid lensing lenslet parameters, and three-dimensional reconstruction of images using a Structure from Motion process.

Multispectral video simulations of the ocean wave fluid lensing phenomenon from the test pool are used to quantitatively validate the remote sensing using fluid lensing process through image quality assessment of reconstructed underwater objects using the Structural Similarity Index (SSIM), signal-to-noise ratio (SNR), and peak signal-to-noise ratio (PSNR) metrics. The test pool simulations are also used to explore the ocean wave fluid lensing phenomenon and discover relationships between caustic behavior, the fluid surface, and depth.

The process of remote sensing using fluid lensing, including three-dimensional reconstruction phase, was successfully used on image data collected by a multirotor unmanned aerial vehicle (UAV) in real-world conditions as part of two cm-scale airborne remote sensing field campaigns of reef ecosystems in American Samoa and Hamelin Pool, Western Australia.

The ocean wave component of the ocean wave fluid lensing phenomenon was modelled using the Fourier domain ocean wave synthesis process by Tessendorf, based on the Phillips spectrum previously described. The synthesized ocean wave field was coupled to water's empirically-determined optical absorption properties described by Pope and refractive properties described by Daimon & Masumura to simulate the optofluidic interactions in the ocean wave fluid lensing phenomenon.

Ocean wave synthesis is performed using Tessendorf's Fourier domain method, based on the Phillips spectrum. Blender's ocean wave modifier, derived from the Houdini Ocean Toolkit, generates a surface mesh from a parameterized Phillips spectrum. The ocean surface height field $h(x, t)$ is represented as the sum of periodic functions such that:

$$h(x, t) = \sum_k \tilde{h}(k, t) e^{ikx}$$

where k is the wave number, k is the wave vector, T is the wave period, $\lambda$ is the wavelength, h is the height of the water, x is the spatial position of the simulation point, t is time, g is the gravitational constant, $P_k$ is the Phillips spectrum, $\xi$ is an independent draw from a Gaussian random number generator with $\mu=0$ and $\sigma=1$, L is the largest permissible wave arising from a given wind speed, $\omega$ is the angular frequency, and w is the wind direction.

The set of complex Fourier amplitudes and initial phase values at t=0, is defined by the following expression:

$$\tilde{h}_0(k) = \frac{1}{\sqrt{2}}(\xi_r + i\xi_i)\sqrt{P_h(k)}$$

where initial parameters are taken from a Gaussian random number generator, $\xi_i$, and $P_h(k)$ is the Phillips spectrum, commonly used to characterize wind-driven waves. The Phillips spectrum characterizes the spectral and statistical properties of the equilibrium range of wind-generated gravity waves and is generated by the following expression, put forth by Phillips.

$$P_h(k) = \frac{A|\hat{k} \cdot w|^2 e^{-\frac{1}{(kL)^2}}}{k^4}$$

Taking the simplified deep-water dispersion relation, $\omega = \sqrt{gk}$ into this relation, the Fourier domain wave amplitudes at time t is:

$$\tilde{h}(k,t) = \tilde{h}_0(k) e^{i\omega(k)t} + \tilde{h}_0^*(-k) e^{-i\omega(k)t}$$

with $\tilde{h}^*(k,t) = \tilde{h}(-k,t)$, this expression has the valuable property that t can be determined at any timestep without solving for all t.

To model the ocean wave fluid lensing phenomenon as part of the test pool simulation, the parameters shown below were chosen as inputs to Blender's ocean wave modifier, based on representative coastal ocean wave power spectra. The power spectrum of ocean waves defined by the parameters below are used in generating $P_h(k)$, and through an inverse Fourier transform, mapped to a spatial wave height $h(x, t)$. The wave height point cloud is then used to generate an ocean surface mesh using bicubic spline interpolation. A sample of an ocean surface wave mesh generated using this technique is shown in FIG. 2.

According to some embodiments, additional ocean wave synthesis parameters for modelling the ocean wave fluid lensing phenomenon and the test pool are listed in the Table below:

Ocean Wave Mesh Geometry:

| | |
|---|---|
| Resolution X, Resolution Y | 1, 1. Mesh is spatially non-repeating. |
| Time Range | [1, 10] at 30 Hz. 600 total frames. |
| Resolution (square root of mesh cell size) | 30. (900 × 900 mesh size, 810000 faces). |
| Depth | Set to 1 m to allow for high-frequency waves |
| Random Seed | 0. Allows for consistent wave simulation. |
| Spatial Size, and Size Parameter | 12 × 12 meter square domain, 1x scale factor. |

Ocean Wave Mesh Wave Parameters:

| | |
|---|---|
| Alignment | 0. Directionality of ocean waves. A 0 value ensures waves and wind are randomly oriented. |
| Choppiness | 0. Ocean wave surface is only displaced in Z. |
| Scale | 0.050. Amplitude parameter for ocean waves. |
| Smallest Wave | 2 cm. Chosen to properly simulate small wave contributions to lensing effect. |
| Wind Velocity | 5 m/s. Chosen based on typical coastal ocean conditions apparent during airborne field campaigns. |

The following sections present the optofluidic coupling methodology for optical simulation of the ocean wave fluid lensing phenomenon and the Test Pool setup.

Light Transport & Ray-Tracing Methodology

In this example, according to some embodiments, the second component of modeling the ocean wave fluid lensing phenomenon is simulating the optofluidic interactions of light with the ocean wave synthesis generated in the previous section. Ray-tracing and light transport is used to model optofluidic interactions and is performed using LuxRender v.1.6, a physically-based, open-source, and unbiased render engine. For the purposes of simulating the complex optofluidic interactions specific to the ocean wave fluid lensing phenomenon, this example configures LuxRender to use an efficient CPU-based unbiased bidirectional path tracing render engine with Metropolis Light Transport (MLT) for efficient sampling and caustic convergence.

The ocean wave synthesis, generated using the methods in the previous section, are here coupled to water's empirically-determined optical properties. Pure water's optical properties were chosen for all multispectral light transport used in this work. Clear seawater and pure water have similar optical properties relevant to this example; however, the inherent optical properties of real-world marine environments may differ significantly due to suspended sediment, carbon-dissolved organic matter (CDOM), phytoplankton, molecular scattering, and salinity, among other things. This example did not model the ocean wave fluid lensing as a function of all of these parameters, but focuses on the dispersive, absorptive, reflective, and refractive properties of water discussed earlier that effectively dominate the fluid lensing phenomenon. It will be appreciated that the framework developed here can be adapted to model additional complexity in the water column.

LuxRender was configured to model multispectral light transport through multiple specular and diffuse interactions, reflection, refraction, absorption, and dispersion. Ambient illumination is provided by a diffuse sky background with a 5800K blackbody spectrum Sun lamp at infinity with a 45-degree illumination angle, as shown in the next section. These sources were used in this example to fully illuminate the scene with MLT sampling and bidirectional path tracing. Physically-based bidirectional path tracing and MLT sampling are both computationally intensive methodologies for ray-tracing, but afford crucial advantages to this work that permit accurate modelling of the ocean wave fluid lensing phenomenon:

1. Efficient and unbiased convergence properties for caustic rendering.

2. Efficient and unbiased approximation of photon-shot noise for simulation of remote sensing instrument signal-to-noise ratio (SNR) properties. This property allows for direct comparison of simulation results to real-world instrumentation properties in photon-limited remote sensing where photons are Poisson-distributed in intensity and frequency at the focal plane array.

3. Repeatable convergence properties and ability to fix random seeds for uniform noise distribution across animation rendering.

4. Accurate multispectral light transport and modelling of wavelength-dependent optical materials.

This methodology was implemented for rendering a test pool, described in the following section, which models the ocean wave fluid lensing phenomenon in a controlled and repeatable environment consisting of image quality assessment and color resolution test targets, bathymetry features, three-dimensional coral-textured objects, and two-dimensional coral-textured objects.

All distorted fluid frames in the test pool were rendered at 4000×1800 pixels, in 16-bit color, and saved as uncompressed PNG files. Output results were reduced to 8-bit PNG files, but 16-bit depth data remain available for future work. The test pool simulation spans 600 frames, or 20 seconds at 30 frames per second (fps). The distorted fluid frames are rendered to 99.9% convergence using Luxrender. Each frame, on average, is solved in ~27 hrs on 32 cores at 3.2 GHz with 64 GB of RAM. For the Flat Fluid Reference Frame, No Fluid Reference Frame, and 2× Flat Fluid Frame, the convergence threshold is set to 99.99%, with ~96 hrs of computation time on a 32-core desktop. Additional render parameters, as well as dataset source files, are provided in the Appendix. Simulation of the Fluid Lensing Process Validation Test Pool was performed at NASA Ames Research Center on the Pleiades Supercomputer through the NASA Earth Exchange (NEX) and represents over 500,000 CPU core-hours of computational time. Convergence thresholds were chosen such as to adequately resolve caustic features within the total CPU time available.

As discussed above, the process for remote sensing using fluid lensing makes use of an Ocean Wave Fluid Lensing Theory to describe basic relationships between fluid lensing lenslets, caustic cells, image formation, magnification, and depth. The process comprises four phases.

In the first phase, the process characterizes fluid distortion by determining fluid lensing parameters, and parameterizing the fluid lensing surface.

In the second phase, the process then characterizes the apparent and true caustic cell size, lenslet size, lenslet group velocity, lenslet curvature, and bathymetry, and utilizes the derived lenslet parameters and fluid surface parameterizations to constrain the displacement and transformation of underwater benthic features and solve for the fluid lensing lenslet homography.

In the third phase, benthic feature identification is performed using the Scale-Invariant Feature Transform (SIFT). Lenslet feature magnification, displacement, and caustic bathymetry are used to constrain and precondition the SIFT Flow process to perform fluid lensing lenslet homography. Results from the fluid lensing lenslet homography are integrated for the final 2D fluid lensing result.

Finally, in the last phase, multiple outputs of the 2D fluid lensing phase and aircraft telemetry are used to solve for 3D structure using a modified Structure from Motion (SfM).

Inputs for this example of the fluid lensing process were:

1. High-frame-rate georeferenced uncompressed multispectral video frames. The frame-rate is constrained by the lenslet group velocity and first derivative of the lenslet curvature. Altitude is referenced to mean sea level (MSL). At least two multispectral bands are required.

2. Sun angle with respect to MSL.

3. Instrument intrinsic camera parameters.

4. Approximate absorptive and refractive properties of both fluids as a function of wavelength.

As a passive remote sensing technology, the fluid lensing method is limited by the inherent optical properties of the water-column and ambient irradiance to depths of −10-30 m in clear natural waters. However, fluid lensing explicitly exploits favorable lenslet magnification and multiple frames to not only remove strong distortions along the optical path, but also enhance the signal-to-noise ratio (SNR) and angular resolution of an otherwise aperture-constrained optical system and focal plane array. Further, caustic phenomena are exploited as high-SNR regions for image integration.

Previously described and derived expressions are applied to this example to illustrate remote sensing using fluid lensing. The discontinuity in refractive index across the two-fluid interface of air and seawater causes the phenomenon of refraction. Snell's law relates the direction geometric light rays propagate to the refractive medium in which they propagate, such that $n_{air} \sin(\theta_1) = n_{seawater} \sin(\theta_2)$.

FIG. 4 is a diagram illustrating the apparent depth distortion effect of air-seawater optical interaction, assuming a flat fluid surface, according to some embodiments. Considering the simplest case of rays propagating from a benthic object through the air-seawater boundary, refraction causes the apparent depth of a benthic object to appear shallower than its true depth, as observed from above the surface. With reference to FIG. 4, an object O, located at depth d, with respect to mean sea level (MSL), appears as O' at apparent depth q. Using Snell's law, it can be shown that the actual depth and the apparent depth are related by the refractive depth distortion equation:

$$q = -\frac{n_{air}}{n_{seawater}} d$$

With $n_{air}=1$ and $n_{seawater}=1.33$, this yields $q=-0.752d$. Accordingly, for a flat fluid sea surface and nadir camera viewpoint, the apparent depth is approximately three-fourths the actual depth on Earth. This refraction effect magnifies the object by an inversely proportional amount.

FIG. 5 is a diagram illustrating the effect of focusing of light rays refraction in the presence of a fluid lenslet, which provides a curved fluid surface, according to some embodiments. In particular, the presence of an ocean wave that assumes the form of a lenslet of curvature $R_{lens}$, further changing the optics from the flat fluid surface example shown in FIG. 4. For an object O at height p from the lenslet surface, the combined effect of refraction and the curvature of the two-fluid interface causes light rays emerging from the object to converge at the focal distance q, and form image I, as illustrated in FIG. 4. Using the small angle approximation for incident light rays, Snell's law becomes $n_{air}\theta_1=n_{seawater}\theta_2$. Using exterior angle relations, it can be shown that $\theta_1=\alpha+\beta$ and $\theta_2=\beta-\gamma$. Combining these expressions yields $n_{air}\alpha+n_{seawater}\gamma=\beta(n_{seawater}-n_{air})$.

Given the three right triangles in FIG. 5 all share side h, and using the small angle approximation, it can be shown that $\tan(\alpha)\approx\alpha\approx d/p$, $\tan(\beta)\approx\beta\approx d/R$, and $\tan(\gamma)\approx\gamma\approx d/q$. Substituting these linearized expressions into $n_{air}\alpha+n_{seawater}\gamma=\beta(n_{seawater}-n_{air})$ yields the refractive lenslet image equation:

$$\frac{n_{air}}{p} + \frac{n_{seawater}}{q} = \frac{n_{seawater} - n_{air}}{R}$$

In the case of the flat fluid surface, $R\to\infty$, and the refractive lenslet image equation yields the refractive depth distortion equation shown earlier:

$$q = -\frac{n_{air}}{n_{seawater}} d.$$

FIG. 6 is a diagram illustrating the effect of the Sun's illuminating a refractive lenslet surface to form a caustic, according to embodiments. The refractive lenslet image equation explains the formation of caustic and the phenomenon of caustic focusing from the light gathering area of the lenslet. In particular, FIG. 6 illustrates the formation of an image, I, at focal point q. Given the angular size of the Sun as viewed from Earth and orbital distance, incident light waves are approximated as planar. With $p \gg R$, the refractive lenslet image equation simplifies to the following caustic refractive lenslet focusing equation:

$$\frac{n_{seawater}}{q} = \frac{n_{seawater} - n_{air}}{R}$$

The formation of caustics by refractive lenslets is an important concept in the fluid lensing process. Given a lenslet of constant curvature, R, the focal point of caustic rays is constant across spatially distributed lenslets. In this example embodiment, this behavior is exploited for independently determining bathymetry across the test pool in the caustic bathymetry fluid lensing phase of the remote sensing process.

Multiple lenslets that are heterogeneously spatially distributed across the aquatic surface introduce another phenomenon, the formation of caustic banding and caustic cells. Caustic bands form when lenslets do not have radial symmetry in curvature or aperture. For a symmetric lenslet, such as depicted in 2D in FIG. 6, the caustic forms an Airy disk at the focal point. In contrast, for asymmetric lenslets, the concentrated rays may form a band of light or other non-linear shape. In the instance of multiple heterogeneously shaped lenslets, such as those commonly observed in shallow aquatic systems, these patterns are complex. However, if the lenslets have a predominant spatial size and curvature, these caustic bands are observed to form distinctive patterns with spatial periodicity. Wherever a caustic band forms, a nearby region must exist of low intensity due to conservation of energy across the refractive interface. These low intensity regions between caustic bands form caustic cells. In the case of a symmetric lenslet train, as illustrated in FIG. 7, this caustic cell has a size determined by the distance between the focal points of two lenslets. The caustic cell size is shown to be invariant to depth, as it is effectively the projection of surface lenslets.

FIG. 8 is a diagram illustrating the effect of a refractive lenslet on magnifying a benthic object, with a non-nadir Sun angle with respect to the fluid surface, according to some embodiments. Caustic cell size remains invariant and is related to the Sun angle, $\varphi$, by the relationship depicted in FIG. 8, where the optical path length is $k(\varphi)+d$. Similar to the apparent depth distortion from the flat fluid surface described earlier, the presence of the two-fluid interface effectively magnifies a submerged object.

Introducing the curvature of a lenslet at the interface further magnifies a submerged object, as illustrated in the diagram of FIG. 9. Here, it is important to note that in the case of a nadir Sun angle $$\left(\varphi = \frac{\pi}{2}\right),$$

the caustic refractive lenslet focusing equation yields the distance to the focal plane of the caustic, which may not coincide with the benthic object depth, d. In the case of a non-nadir Sun angle, the caustic focal point is not along the same optical axis as the magnifying lenslet above the benthic object. Hence, a non-nadir Sun angle introduces caustic bands which illuminate benthic objects off their optical axis, as shown in FIG. 8. However, observing the fluid surface with the Sun at $$\varphi = \frac{\pi}{2},$$

or noon at the Equator, with a nadir pointing instrument introduces significant specular glare and reflections. As such, the fluid lensing process is developed for arbitrary Sun angle, $\varphi$.

Given a benthic object depth, d, and adopting the same derivation as the refractive lenslet image equation, results in the refractive lenslet magnification equation, which is a function of depth:

$$\frac{n_{air}}{R-d} + \frac{n_{seawater}}{q} = \frac{n_{seawater} - n_{air}}{R}$$

FIG. 10 is a flow diagram illustrating fluid distortion characterization phase 1000 of the fluid lensing process, according to some embodiments. It consists of six primary steps, and is the first phase of the fluid lensing process. The goal of this phase is to determine the spatial locations of caustic focal planes, caustic cell size, lenslet spatial periodicity, lenslet group velocity, and compute the baseline mean and median images over all input frames.

At step 1001, specular reflection is corrected in the input multispectral video frames. According to some embodiments, a histogram of pixel intensity from the input frames is clipped to remove specular reflections, subject to maximal area constraint. As caustic intensity may exceed the intensity of specular reflections, specular reflection pixels are identified uniquely by sigma clipping the highest intensity pixels that exhibit a connectivity to neighboring equal intensity pixels. In an example embodiment, the connectivity neighborhood is chosen qualitatively to remove specular artifacts in each input frame, and has a value of 2 pixels for this example.

At step 1003, the spatial location of the bathymetric feature closest to the caustic focal plane of the fluid lensing lenslets across the entire frame set is determined. Input frames are median filtered with a 3×3 kernel to remove specular noise artifacts and the gradient of the image is computed. Peaks in the gradient image are identified which occur at high pixel intensities, indicating a region of sharply focused caustics. This caustic focal region is later used in the caustic bathymetry fluid lensing process.

At step 1005, all input images are scanned to determine the maximal apparent caustic cell size. In particular, apparent caustic cell size and spatial variation are determined as maximal of gradient ascent path length over all frames. Caustic cell size is invariant of depth and two times the fluid lens, or lenslet size. The apparent caustic cell size is computed with a moving window search of increasing size. The search area is median filtered to remove noise artifacts with a 3×3 kernel. In each moving window, a gradient ascent method is used to march from the lowest intensity pixel in the direction of an increasing gradient until stopping over a caustic band. These data are saved to a matrix and compared to larger and larger window sizes. Once the caustic cell size is reached, larger window sizes do not change the output of the gradient ascent method as multiple local maxima exist in the form of neighboring caustic bands. The maximum caustic cell sizes are computed for each moving window centroid across all frames.

At step 1007, the process utilizes the caustic cell size as a local search window. More particularly, while using virtual fluid lensing size as moving window, the process determines the peak amplitude and corresponding frequency in DFT of caustic bands at caustic plane over all frames, and uses altitude and instrument ground sample distance (GSD) to relate to virtual fluid lenslet group velocity. Within this window, grayscale, median-filtered intensity of the center pixel is plotted over all time for all frames. The discrete Fourier transform is computed and the peak caustic band sweeping frequency, which is considered a measure of the lenslet group velocity, $v_g$, when corrected for sun angle, is identified.

At step 1009, normalized mean and median image of all frames is determined. This step assumes zero displacement of the camera, which is the case for the Test Pool. In the case of a moving camera, such as that of an airborne instrument, the 3D Airborne Fluid Lensing Process is used, discussed in later sections.

At step 1011, the process generates mean histograms of the caustic test areas over all frames, as well as the maximum and minimum median-filtered intensities versus the mean image intensities. In particular, the process determines normalized mean and median range across all frames, and interpolate with a drizzle factor, spatial intensity variation for mean range, and uses mean image to measure spatial variation of caustic intensity focusing and range.

FIG. 11 is a flow diagram illustrating phase 1100 for determining the caustic bathymetry of the underwater environment observed, according to some embodiments. This phase uniquely characterizes the bathymetry of the benthic scene from caustic behavior alone, without relying on current methodologies based on purely absorptive models. This approach involves spatial localization of the caustic focal plane, characterization of the fluid lensing lenslet curvature, determination of the true caustic cell size, and correction for the sun angle.

At step 1101, the process receives input of the spatial location of the caustic focal plane, as determined from the fluid distortion characterization phase 1000, and creates an initial depth estimate of the caustic focal plane. Here, the methodology is to use inherent optical properties of fluid to characterize the attenuation coefficient to determine the ratio of the maximum caustic intensity over all frames in two different color bands, in this case, Red and Blue, $$\frac{I(R)}{I(B)}.$$

These ratios are calculated for each frame and averaged for all frames. Then, based on the absorptive model, a depth estimate is generated for the caustic focal plane. Sun angle is also used to determine total optical path length. The motivation for using maximal caustic intensities is markedly improved SNR for this depth estimate, $q_{caustic\ focal\ plane}$, about which caustics will defocus both with increasing and decreasing depth.

At step 1103, $q_{caustic\ focal\ plane}$ is used in the refractive lenslet equation to calculate the fluid lensing lenslet curvature, R.

At step 1105, the fluid lensing lenslet curvature, R, is inputted into the refractive lenslet magnification equation to correct the apparent caustic cell size results and determine depth from the apparent magnification factor of the true caustic cell size, which is assumed to be invariant with depth, as derived in the ocean wave fluid lensing theory.

At step 1107, the previous steps are repeated over the entire frame with a moving window size proportional to the apparent caustic cell size in that spatial location. Finally, at step 1109, the results from all frames are averaged over the local moving window size to generate a spatial map of depth, the caustic bathymetry map. The results of the caustic bathymetry map are compared to the depth of the test pool simulation to determine the accuracy of this methodology for shallow depth modelling.

Benthic Image Reconstruction

FIG. 12 is a flow diagram that illustrates the core process for two-dimensional benthic image reconstruction according to some embodiments. This process consists of four primary steps that incorporate the ocean wave fluid lensing model and the above-described phases to bound and precondition the SIFT Flow energy function to perform the benthic image reconstruction phase of remote sensing using fluid lensing.

The following are some conditions governing the implementation of the process in this example, and according to some embodiments:

1. It is hypothesized that the fluid lensing lenslet curvature, R, determined from the preceding phases using caustic behavior, describes the primary lenslet responsible for the large-scale refractive magnification of benthic objects. In cases of non-nadir sun-angle, lenslets forming caustic patterns are not the same as those through which benthic objects are being imaged from a nadir camera, but are taken to be similar in curvature properties. That is, fluid lensing lenslet curvature is locally spatially homogenous over multiple caustic cell sizes.

2. It is assumed that fluid lensing lenslets form apparent caustic cell sizes that are larger than the ground sample distance of the remote sensing instrument, such that the instrument satisfies the Nyquist sampling criterion for true caustic cell size.

3. It is assumed that fluid lensing lenslets have a spatial periodicity that is many times larger than the smallest benthic feature to be resolved.

4. Most relevant for resolution enhancement using the 2D fluid lensing process, it is assumed that fluid lensing lenslets, by means of refractive magnification, contain high-frequency image information beyond the Nyquist sampling limit of the image sensor without a fluid. This is a result predicted by the refractive lenslet magnification equation and validated in the fluid-distorted frames from the test pool simulation.

5. It is required that the image sensor temporal sampling rate [Hz] and spatial coverage [m] are much greater than the fluid lensing lenslet group velocity, $v_g$, multiplied by the inverse of apparent caustic cell size and greater than the apparent caustic cell size multiplied by the inverse of fluid lensing lenslet group velocity, respectively.

6. It is assumed that as the number of frames tends to infinity, the mean image of fluid-distorted frames approaches the result of a Gaussian kernel convolved with the flat fluid image; namely, that the integrated effect of ocean wave refractive distortion over time approaches a Gaussian process. While this statement is shown to be approximate, it allows for use of the mean image as a reference frame for Fluid Lensing Lenslet Homography and matching of SIFT features in a Gaussian scale pyramid representation of input frames.

In step 1201, the 2D fluid lensing process receives the inputs of raw image frames, camera altitude, sun angle, various camera parameters, and fluid optics properties. At step 1203, the process preprocesses images using fluid distortion characterization and caustic bathymetry mapping, as described above. At step 1205, the process drizzles frames by an expected magnification factor from the lenslet curvature and caustic bathymetry. At step 1207, the process searches for Scale-Invariant Feature Transform (SIFT) features over a window size equal to the apparent caustic cell size over an object for each input frame and compares detected SIFT features to SIFT features of the mean image. Embodiments using SIFT, shown in FIG. 3 as detecting and matching keypoints in the USAF test target and a transformed version, was previously described.

In step 1209 of this example embodiment, SIFT keypoints are used as part of a modified SIFT Flow process, which differs from the original process formulation. For the purposes of the 2D Fluid Lensing Process, SIFT Flow is modified by preconditioning and bounding the SIFT Flow Energy Function by the derived Fluid Lensing Lenslet parameters and caustic bathymetry map. In step 1211, this process is determines the flow vector of a fluid lensing lenslet and warps the lenslet to a mean image feature. The transformation of the lenslet to a mean image feature is referred to as fluid lensing lenslet homography.

In other words, in the process of fluid lensing lenslet homography, high-frequency image content of a benthic feature within the lenslet is preserved, provided condition number four is met. This process of lenslet homography includes the step of drizzling the lenslet window by the magnification factor predicted from the lenslet curvature and local caustic bathymetry map result. Ultimately, this affords the process the ability to exploit fluid lensing lenslets and capture small-scale benthic features magnified by the lenslet. Lenslet SIFT features are matched at the Gaussian pyramid scale corresponding to a mean image SIFT feature. This scale occurs at the apparent caustic cell size. SIFT Flow is used to find dense correspondence between lenslets and mean image SIFT features and unwarp lenslet images. In step 1211, each unwarped lenslet frame is solved and integrated over the frame set to form the final fluid lensing reconstruction.

The integrated fluid lensing image is spatially evaluated using a Structural Similarity Index (SSIM). Integration of fluid-corrected frames increases the signal-to-noise properties of the fluid lensing reconstruction, proportional to the square root of the number of frames. This increase in signal-to-noise ratio (SNR) is quantified in a validation process.

Fluid lensing lenslet homography is performed using a bounded and preconditioned version of the SIFT Flow process, illustrated in FIG. 13. As described above, given two SIFT images, $s_1$ and $s_2$, SIFT flow solves for the flow vector, $w(p)=(u(p), v(p))$, which minimizes the SIFT Flow energy function $E(w)$:

$$E(w) = \sum_p \min(\|s_1(p) - s_2(p + w(p))\|_1, t) + \sum_p \eta(|u(p)| + |v(p)|) + \sum_{(p,q)\in\varepsilon} \min(\alpha|u(p) - u(q)|, d) + \min(\alpha|v(p) - v(q)|, d)$$

where t and d are thresholds, $\eta$ is the small displacement term, a is the smoothness term, and $\varepsilon$ is the spatial neighborhood.

In a sense, the objective of the SIFT Flow process is more complicated than what is required for lenslet homography as SIFT Flow searches for dense correspondence across non-sequential images, or images from different scenes altogether. Fluid lensing lenslet homography differs in that frames are provided sequentially at a frequency high enough to ensure spatial and temporal continuity in pixels as they are distorted by a travelling wave, akin to optical flow. In the case that frames are not recorded at this frame-rate, this assumption reverts back to the SIFT Flow problem of dense correspondence. This case is not considered here.

Lenslet homography is premised on the assumption that, knowing the depth of the object from the caustic bathymetry process map, the maximum displacement of a pixel can be predicted using the lenslet curvature, apparent caustic cell size, and lenslet frequency, or group velocity.

Fluid lensing lenslet homography uses processes 1000, 1100, and 1200 to determine three key lenslet parameters for preconditioning and bounding the flow vector, w(p)=(u (p), v(p)). First, the Fluid Lensing Lenslet Group Velocity, $v_g$, calculated from the lenslet frequency and image ground sample distance, imposes a constraint on the displacement of a pixel between frames, namely $v_g \Delta t$ where $\Delta t$ is the single frame integration time. Second, the lenslet curvature, R, and the apparent caustic cell size determine the spatial extent of a lenslet, or lenslet window. Together, with the caustic bathymetry map, these parameters are used to predict the maximum expected magnification factor, which bounds the maximum spatial displacement of a SIFT image feature. These parameters are used to interrupt the coarse-to-fine matching scheme implemented in SIFT Flow before reaching the pixel scale. The coarse-to-fine matching scheme is interrupted at the lenslet window size. A SIFT image of the mean image, shown as the 'SIFT image' in FIG. 13 is used as a reference for matching the SIFT image of an input frame. However, the mean image pixel-scale SIFT features are lost due to the integrated effect of fluid distortions. Here, assumption number six is invoked. The coarse-to-fine matching scheme computes a Gaussian scale pyramid for an input frame in an effort to reduce computational time. Here, it is assumed that the mean image approximates one of the scales of the Gaussian pyramid of an input frame, up to the scale of the lenslet window size. So, the coarse-to-fine iteration scheme is halted at the lenslet window size in an effort to capture the lenslet warping. The SIFT Flow PCA image in FIG. 13 shows an example of this matching scheme and reveals the spatial extent of the fluid lensing lenslet.

It should be noted that numerous unsuccessful attempts were made to use SIFT Flow for blind benthic image reconstruction, without the novel preconditioning and bounding of SIFT Flow using the fluid lensing lenslet parameters. It is suspected that the large variance in lenslet distortion and formulation of the original SIFT Flow process, searching for dense correspondence across nonsequential scenes, made this approach untenable. Unless the lenslet parameters, bathymetry, sun angle, platform positional data, and all the listed Fluid Lensing inputs were adequately known, this methodology did not yield image reconstruction results that significantly improved upon the mean image.

FIG. 14 is a flow diagram illustrating the 3D Airborne Fluid Lensing Process according to some embodiments, which expands upon the methodology behind the 2D Fluid Lensing Process and develops a process for airborne remote sensing and 3D scene estimation for aquatic environments. Remote sensing of aquatic environments from an airborne or spaceborne platform introduces significant additional complexity to the 2D Fluid Lensing Process. The relative motion of a moving platform with respect to the aquatic surface requires preconditioning of remote sensing data for processing with the 2D Fluid Lensing Process. However, platform telemetry such as positional data from GPS systems, barometric pressure sensors, accelerometers, and rate gyros can be used to precondition image data. Combined with the caustic bathymetry process and the 2D Fluid Lensing Process, these data may be used with Structure from Motion (SfM) to reconstruct a 3D scene underwater.

In this example, a process 1400 is introduced to use multiple solutions from the 2D Fluid Lensing process along with remote sensing platform telemetry to perform 3D scene estimation.

In step 1401, the input frames are calibrated using the camera matrix and preregistered using the telemetry data from the remote sensing platform. Fine registration is performed using specular-reflection thresholded frames and minimization of the L1 norm of frames with respect to the middle frame. Image registration displacements are calculated for the full frame stack size, in this case 90 frames, and images are transformed accordingly to form a registered stack. The common area of the frame stack is identified and extraneous areas are cropped.

In step 1403, the common area stack of frames is input into the 2D Fluid Lensing Process and a 2D result is generated. In step 1405, each 2D Fluid Lensing result is appended with platform positional data. In step 1407, the Z component of the platform position, altitude, is corrected using the caustic bathymetry map estimate of the benthic surface. In step 1409, the 2D Fluid Lensing results generated every 90 frames are input into a Structure from Motion solver. In some embodiments, Agisoft PhotoScan Pro® available from Agisoft LLC can be used for dense point cloud generation and ground control point calibration.

Multispectral video simulations of the ocean wave fluid lensing phenomenon using the Fluid Lensing Test Pool simulation are used to quantitatively validate the Fluid Lensing Process through image quality assessment of reconstructed two-dimensional objects using the Structural Similarity Index (SSIM), Signal to Noise Ratio (SNR), and Peak SNR (PSNR). These two metrics allow for directly quantifying the two main challenges addressed by the Fluid Lensing Process—ocean wave refractive distortion and its effect on effective spatial resolution, and attenuation of visible light in the water column and its effect on the signal-to-noise properties of images of benthic objects.

An image quality metric assesses the visual impact of three characteristics of an image: luminance, contrast and structure. The Structural Similarity (SSIM) Index for image quality assessment is based on the computation of three terms, namely the luminance term, the contrast term and the structural term. The overall index is a multiplicative combination of the three terms.

$$SSIM(Ref_{Img}, Test_{Img}) =$$
$$[l(Ref_{Img}, Test_{Img})]^\alpha \cdot [c(Ref_{Img}, Test_{Img})]^\beta \cdot [s(Ref_{Img}, Test_{Img})]^\gamma$$

with $$l(Ref_{Img}, Test_{Img}) = \frac{2\mu_{Ref_{Img}}\mu_{Test_{Img}} + c_1}{\mu_{Ref_{Img}}^2 + \mu_{Test_{Img}}^2 + c_1}$$

$$c(Ref_{Img}, Test_{Img}) = \frac{2\sigma_{Ref_{Img}}\sigma_{Test_{Img}} + c_2}{\sigma_{Ref_{Img}}^2 + \sigma_{Test_{Img}}^2 + c_2}$$

$$s(Ref_{Img}, Test_{Img}) = \frac{Ref_{Img} \star Test_{Img} + c_3}{\sigma_{Ref_{Img}}\sigma_{Test_{Img}} + c_3}$$

where $\mu_i$ is the local mean, $\sigma_i$ is the local standard deviation, and $\star$ is the cross-covariance. For this work, $\alpha=\beta=\gamma=1$, and $c_1$, $c_2$, $c_3$ are the regularization constants for luminance, contrast, and structural terms. By default, these values are chosen based on the dynamic range of the images.

SSIM is measured with the Flat Fluid Reference render as the reference image and with the 2D Fluid Lensing result, Mean Image, and Raw Fluid-Distorted Frames as test images for each of the eleven test target platforms. SSIM of unity is a perfect match, SSIM of zero is the lowest match score. Additionally, the 2× Flat Fluid Reference render is used as a reference image to validate the ability of the 2D Fluid Lensing Process to exceed the native resolution of the image frames.

In addition to resolution quantification using SSIM, the signal-to-noise properties of Fluid Lensing reconstructions are quantified using SNR and PSNR metrics. The SNR of a signal can be defined as the ratio of the mean of the signal, $\mu_{signal}$, to its standard deviation, $\sigma_{signal}$:

$$SNR = \frac{\mu_{signal}}{\sigma_{signal}}$$

For an image matrix, this can be expressed in decibels (dB) as:

$$SNR = 20 \log_{10} \frac{signal}{RMS\ noise} [dB]$$

Where RMS noise is the root-mean-square noise of the image. Finally, PSNR is also quantified for all results such that:

$$PSNR = 20 \log_{10} \frac{MAX_f}{\sqrt{MSE}} [dB]$$

where $MAX_f$ is the maximum signal value, and MSE is the mean squared error.

These metrics are used with the Flat Fluid Reference render as the reference image and with the 2D Fluid Lensing result, Mean Image, and Raw Fluid Distorted Frames as test images for each of the eleven test target platforms.

Airborne Fluid Lensing Methodology for Ofu Island & Hamelin Pool Field Campaigns Two experimental airborne surveys were conducted over the coral reefs of Ofu Island, American Samoa (2013) and the stromatolite reefs of Shark Bay, Western Australia (2014), a UNESCO World Heritage site to capture image data and metadata for testing fluid lensing's ability to reconstruct submerged targets in 3D from an airborne platform over unique aquatic ecosystems with diverse fluid properties. An unmanned aerial vehicle (UAV) electric quadcopter platform was custom-built to host a nadir-pointing high-frame-rate video camera to capture moving image data, to relay synchronized position data of the UAV, and to survey a region with sequential flights, each up to 20 minutes in duration.

Subsequently, videos frames were sorted into 120-frame bins and processed using the 3D Airborne Fluid Lensing Process. Calibration targets were distributed at varying water depths for georeferencing and bathymetry validation. Finally, terrestrial and mm-scale underwater gigapixel photogrammetry was performed to calibrate and verify 2D Fluid Lensing reconstructions from airborne data, perform georectification and validate derived 3D bathymetry products.

UAVs offer a cost-effective tool for high temporal and spatial remote sensing of terrestrial environments. However, using UAVs for Fluid Lensing over aquatic environments requires unique hardware and specialized flight operations. For the airborne video capture operation in Samoa, an electric UAV quadcopter platform was custom-built to host a nadir-pointing high-frame-rate video camera and relay synchronized position data while surveying a region with sequential flights, each up to 20 minutes in duration. Flights were conducted between 1-6 m/s groundspeed as a function of observed ocean surface wave conditions, corresponding to the dominant lensing wave period in order to capture sufficient lensing events for target reconstruction. The video capture operation in Shark Bay used a higher-endurance quadrotor platform to gather data. All UAVs were launched and landed under manual control, and conducted imaging transects under automated waypoint navigation. The aircraft were flown within line of sight, with a live telemetry link to ground stations. All flights were conducted between 23-34 meters altitude, as measured by pressure-corrected GPS. Design characteristics of each UAV, specific to the operational environment, included low noise levels (<40 dB), battery-electric operation, custom marinized parts, camera gimbal pointing accuracy <0.1 degree, and a system cost of under 10,000 USD each.

The video and associate data collected during the airborne operations were used as inputs for calibration and validation of fluid lensing 2D reconstruction, color correction and 3D bathymetry products. To validate 2D and 3D data generated by Fluid Lensing and SfM, high-resolution underwater panoramas were taken throughout both survey regions and quantitatively compared to Fluid Lensing reconstructions. For the survey regions, the highest-resolution publically-available imagery identified was from the Pleiades-1A satellite with a GSD of 0.5 m, accessed June 2015. Each panorama was digitally synthesized using a high-dynamic-range process with thousands of images spread across the full 360-degree field of view from a custom underwater camera system imaging at the nodal point of a 36-megapixel digital single-lens reflex (DSLR) camera. Camera calibrations for the Fluid Lensing cameras and DSLR were used to compute calibration parameters for the Fluid Lensing and SfM process, as well as photogrammetry and bathymetry scaling. Final gigapixel panoramas were produced with equirectangular and stereographic projections, geotagged control points, and instantaneous depth measurements by plumb-bob (±0.1 m). In select regions of the aerial survey results, final panoramas were further referenced as underwater survey transects for aquatic species identification. Finally, underwater calibration targets were used to further validate reconstruction results, perform color correction and improve accuracy of georectification.

Following the validation of the fluid lensing process on the video and data collected from the field campaigns, Fluid Lensing instruments, called FluidCams, were developed, as shown in FIG. 15. The FluidCams specifically address the bandwidth, SNR and computational requirements of Fluid Lensing from UAVs and space-based platforms. FluidCams are integrated optical systems, imagers, and high-performance computational instruments designed for UAVs and eventual suborbital deployment. They were recently matured to level ready for operational missions on UAVs. The FluidCam devices operate at image frame rates up to 1200 Hz and with data rates exceeding 370 MB/s. These capabilities enable sub-cm Fluid Lensing reconstructions. Additionally, FluidCams can communicate directly to UAV autopilots and modify the flight speed depending on observed ocean wave conditions. This allows for autonomous high-speed surveys using payload-directed flight methods and on-board pre-processing.

An active 5-channel and 36-channel multispectral instrument, such as the Multispectral Imaging, Detection and Active Reflectance (MiDAR) instrument described in U.S. Pat. No. 10,041,833, issued to Chirayath, can be used with present embodiments. MiDAR operates with an active illumination source and should expand the depth, SNR, and ocean surface conditions for which airborne Fluid Lensing is applicable. MiDAR is a remote sensing technique and instrument for multispectral imaging, detection and active reflectance with next-generation scientific capabilities for simultaneous in-situ, airborne and spaceborne measurements and optical communications. MiDAR consists of an active optical transmitter and passive receiver in monostatic and bistatic configurations. The MiDAR transmitter emits coded narrowband structured illumination to generate high-frame-rate multispectral video, perform real-time radiometric calibration and provide a high-bandwidth simplex optical data-link under a range of ambient irradiance conditions, including darkness. A theoretical framework, based on unique color band signatures, is developed for multispectral video reconstruction and optical communications process used on MiDAR transmitters and receivers. Experimental tests demonstrate a 5-channel MiDAR prototype consisting of an active array of multispectral high-intensity light-emitting diodes (MiDAR transmitter) coupled with a state-of-the-art, high-frame-rate NIR computational imager, the NASA FluidCam NIR, which was used as a MiDAR receiver.

Preliminary results confirm efficient, radiometrically calibrated, high signal-to-noise ratio (SNR) active multispectral imaging in 5 channels from 405-940 nm at 2048×2048 pixels and 30 Hz. These results demonstrate a cost-effective and adaptive sensing modality, with the ability to change color bands and relative intensities in real-time, in response to changing science requirements or dynamic scenes. This technology may be applicable to Fluid Lensing and enhanced optical penetration into the water column. Potential applications of MiDAR include high-resolution nocturnal and diurnal multispectral imaging from air, space and underwater environments as well as long-distance optical communication, bidirectional reflectance distribution function characterization, mineral identification, atmospheric correction, UV/fluorescent imaging, 3D reconstruction using Structure from Motion (SfM) and underwater imaging using Fluid Lensing. Multipurpose sensors, such as MiDAR, which fuse active sensing and communications capabilities, may be particularly well-suited for mass-limited robotic exploration of Earth and the solar system and represent a possible new generation of instruments for active optical remote sensing.

The petabyte-scale datasets generated from the fluid lensing process benefit from efficient automated analysis methods. Results of a parallelized supervised machine learning process developed for accurate semi-automated segmentation of multidimensional collected airborne fluid lensing data offer accurate percent cover and morphology distribution characterization, key measurements for understanding coral reef dynamics and reef resilience. Such methods, currently in development, have broad applicability to other high-resolution datasets and implications for enhanced understanding and observational capability of both terrestrial and aquatic systems at the cm-scale.

Data collected from airborne data captures can be processed using a supervised machine learning methodology. Cm-scale multispectral imagery and bathymetry data, generated from Fluid Lensing, are analyzed using a supervised machine learning process based on multidimensional maximum a posteriori (MAP) estimation. Using a user-supplied training database, comprising ~1% of the total dataset, the process separates living coral structure from nonliving structure with 95% accuracy and segments coral reef morphology into four classes—branching coral, mounding coral, basalt rock, and sand—with 92% accuracy. Training database and machine learning segmentation results are verified with sub-cm-scale 'truth' maps, manually generated from in-situ mapping, underwater gigapixel photogrammetry and visual inspection of the airborne survey areas by subject matter experts. Compared to current datasets and process available for the study region, supervised machine learning using MAP estimation and cm-scale airborne fluid lensing data offer a four-fold decrease in error in morphology classification and a seven-fold decrease in percent cover error.

While datasets generated by airborne Fluid Lensing provide an order of magnitude increase in remote sensing imaging resolution for aquatic environments, they require efficient petabyte-scale supervised machine learning tools for quantitative analysis and determination of parameters such as percent cover and morphology identification over regional scales. Multidimensional supervised machine learning and airborne fluid lensing present an accurate assessment tool for large-scale 3D surveys of shallow aquatic habitats with cm-scale spatial resolution, fine temporal sampling, and quantifiable morphological and biological characterization. Ultimately, these methods demonstrate accurate quantification of habitat morphology and diversity at the centimeter spatial scale for aquatic ecosystems and may readily extend to use for terrestrial systems and validation of other airborne and spaceborne instruments.

Test Pool Simulation

The Fluid Lensing Algorithm Validation Test Pool is constructed to simulate the ocean wave fluid lensing phenomenon and develop a controlled environment for which to quantify and validate the General Fluid Lensing Algorithm. Firstly, the Test Pool is designed to explore the ocean wave fluid lensing phenomenon in a controlled simulation environment, where the ocean surface displacement, ambient illumination conditions, instrument properties, bathymetry, and fluid optical properties can be defined and modelled from first principles. This methodology allows for use of this tool for simulating a range of ocean wave conditions, as well as other fluid lensing environments with different fluid media and environmental parameters in the future. Such applications may include simulation of biological fluids like blood, plasma, or agar, or in extreme environments, such as the liquid hydrocarbon lakes of Saturn's moon Titan, or transparent molten materials in manufacturing.

Secondly, the Test Pool is used to quantitatively validate the Fluid Lensing algorithm on a per-pixel basis and measure error of Fluid Lensing 2D and 3D reconstruction as well as quantify the accuracy of caustic-spreading derived bathymetry for the specialized case of Earth's shallow ocean waves and seawater. The Test Pool is used to generate a control and experimental setup, described in the following error assessment section, to validate the accuracy of the simulated environment, as well as validate the General Fluid Lensing Algorithm.

The Test Pool geometry is designed in Blender and rendered in Luxrender using the general methodology described in the preceding sections with specific simulation parameters. The Test Pool consists of a 10 m×4.5 m×5 m simulation domain with image quality assessment and color resolution test targets, bathymetry features, three-dimensional coral-textured objects, and two-dimensional coral-textured objects mounted atop submerged test platforms. The simulation domain is rendered at 0.25 cm per pixel in 16-bit color, uncompressed, to simulate fluid lensing effects at a fine sub-cm scale. Test Pool meshes and geometries are defined at the sub-mm-scale. The mean fluid surface is the zero-displacement fluid surface, without ocean waves, denoted by MSL, or mean surface level. The fluid surface defines the aquatic boundary with air and extends to the Test Pool depth, with water's optical absorption, reflection, refraction, and dispersion properties, such that all the fluid's optical properties are depth-dependent.

Test Pool Bathymetry Set-Up—The Test Pool floor has a varying depth, D, in meters from mean surface level, defined by the functional, $$D = 5\left(1 - \cos^2\left(\frac{L}{2\pi}\right)\right),$$

where L is the pool length, in meters. This functional depth dependence was arbitrarily chosen to accommodate a range of submerged test platforms at differing depths, up to a maximum depth of 5 meters, with adequate lateral spacing and variation in depth gradient. Further, for numerical error assessment considerations, the functional contains an irrational number, $\pi$. Atop the Test Pool floor are one exposed test platform and ten submerged test platforms equally laterally spaced with increasing depth. These test platforms are described in the following section.

The ocean wave surface is defined by the 12 m×12 m time-dependent mesh, consisting of 810000 faces, generated by the ocean wave synthesis methodology with specific parameters described in the preceding section. The MSL fluid overlaid on the pool's surface, and is referred to as the Flat Fluid Render, or Reference. This flat fluid reference is used for error assessment versus the Fluid Lensing reconstruction and is also rendered at two times the native resolution (3600 px×8000 px) for the 2× Flat Fluid Render, which is used for quantification of resolution enhancement.

Test Pool Platform Setup & 3D Multispectral Resolution Test Targets—The Test Pool contains one exposed test platform and ten submerged test platforms equally laterally spaced with increasing depth, textured with a diffuse 16-bit maximal white shader, connected to the test pool floor and normal to the MSL. The test area (top face) of each platform is located at varying depths from −0.1 (always exposed) to 0.1, 0.2, 0.3, 0.4, 0.5, 1.0, 2.0, 3.0, 4.0, and 4.5 meter depths, MSL, as designated by the platform depth marker beside the 3D test target. Each test platform consists of multiple 2D multispectral test targets, a blank area for capturing caustic behavior, called the Caustic Spreading Test Area, a 2D multispectral image of a brain coral, and a 3D coral test target consisting of a hemisphere textured with a multispectral image of a brain coral. All test target areas measure 50 cm×50 cm (200 px×200 px) in size.

The 2D multispectral image quality assessment (IQA) test targets are based on the IQA, or resolution, target introduced by the United States Air Force (USAF) in 1951, conforming to standard MIL-STD-150A. The USAF test target consists of six groups of vertical and horizontal bars of decreasing size. The scales and dimensions of the bars are given by the expression:

$$\text{Resolution}\left(\frac{lp}{mm}\right) = 2^{Group + (element-1)/6}$$

where $$\frac{lp}{mm}$$

is line pair (black and white line) per mm. Here, the test targets are colorized in 16-bit maximal values of Red, Green, and Blue to model light transport of different optical wavelength combinations through the fluid. Although hexadecimal Red, Green, and Blue values do not correspond to a single physical wavelength, but rather a linear combination of wavelengths, they represent a basic multispectral imaging methodology for this work. The 2D coral test target is comprised of a high-resolution (36 Megapixel) 14-bit color image of a brain coral, photographed by the author with artificial broadband illumination at the Monterey Bay Aquarium Coral Research Tank. An image of a coral was included to better mimic the real-world use scenarios for the General Fluid Lensing Algorithm in reef remote sensing and is used for quantitative as well as qualitative IQA. A blank area textured with the default platform diffuse white shader is provided to capture data for the Caustic Bathymetry Fluid Algorithm, and explore caustic behavior at controlled depths. Finally, a 3D test target consisting of a 40-cm diameter hemisphere is textured with the 2D brain coral image and designed for future validation of the 3D Fluid Lensing algorithm.

Caustic Bathymetry Functional Depth Test Areas—Validation of the Caustic Bathymetry Algorithm is performed using the blank area of the Test Pool that follows the functional depth relationship. The area is divided into a number of regions for analysis of caustic formation changes with depth and localization of the caustic focal plane. The region boundaries were chosen such that multiple caustic cells would be visible within each area under the constraint that the area not vary significantly in depth. Since the test areas are not perfect isobaths, some error is introduced to the caustic bathymetry validation.

Other features, aspects and objects of the invention can be obtained from a review of the figures and the claims. It is to be understood that other embodiments of the invention can be developed and fall within the spirit and scope of the invention and claims.

The foregoing description of embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A computer-implemented method for correcting distorted images captured of underwater environments, the method comprising:
analyzing a plurality of images, the images captured of a benthic scene of objects below a surface of a volume of fluid, the images captured by an imaging device from above the surface, to identify in the plurality of images at least:
one or more spatial locations of bathymetric features closest to caustic focal planes;

an apparent caustic cell size;
a lenslet spatial periodicity;
a lenslet group velocity;
correcting specular reflection by identifying one or more specular reflection pixels in the plurality of images, and transforming said pixels into a plurality of corrected pixels;
determining a bathymetry of the benthic scene of the plurality of images, and generating a caustic bathymetric map based on said determining; and
reconstructing a centimeter-resolution image of the plurality of images.

2. The computer-implemented method of claim 1, wherein the one or more spatial locations are identified by computing a gradient for at least one image, and identifying peaks of high pixel intensity in the gradient image.

3. The computer-implemented method of claim 1, wherein the identifying step includes sigma clipping the highest intensity pixels that exhibit a connectivity to neighboring equal intensity pixels.

4. The computer-implemented method of claim 1, wherein the apparent caustic cell size is identified by a moving window search of increasing size.

5. The computer-implemented method of claim 1, wherein the characterizing of the bathymetry includes a spatial localization of the caustic focal plane, characterization of a fluid lensing lenslet curvature, determination of a true caustic cell size, and correction for a sun angle.

6. The computer-implemented method of claim 1, wherein the step of reconstructing the centimeter-resolution image comprises the steps of:
generating a mean image from the plurality of images;
searching for scale-invariant feature transform (SIFT) features over a window size equal to the apparent caustic cell size to identify lenslet SIFT features in the plurality of images;
searching for SIFT features in the mean image for mean image SIFT features;
comparing the SIFT features searched in the plurality of images with the SIFT features in the mean image and identifying matching features based on the comparing;
determining a correspondence between lenslet SIFT features and mean image SIFT features;
unwarping lenslet images based on the correspondence; and
solving and integrating the unwarped lenslet images over the plurality of images to form the reconstructed centimeter-resolution image.

7. The computer-implemented method of claim 6, wherein the step of reconstructing the centimeter-resolution image comprises the step of first drizzling frames by an expected magnification factor based on the fluid lensing lenslet curvature and the caustic bathymetry characterization.

8. The computer-implemented method of claim 1, further comprising:
(a) receiving a frame stack of images of a particular quantity at a periodic interval of a plurality of periodic intervals;
(b) calibrating the frame stack of images using a camera matrix and preregistered using telemetry data from a remote sensing platform comprising the imaging device;
(c) identifying common areas of the frame stack of images;
(d) performing the correcting step, the determining step, and the reconstructing step to reconstruct a centimeter-resolution image of the frame stack of images; and
(e) inputting the reconstructed centimeter-resolution image of the frame stack into a Structure from Motion solver; and
(f) repeating steps (a)-(e) for a next frame stack received at a next periodic interval of the plurality of periodic intervals.

9. The computer-implemented method of claim 1, wherein the step of correcting specular reflection includes determining a median pixel intensity value of a predefined kernel size in an area around a pixel to generate a median image.

10. The computer-implemented method of claim 8, wherein the remote sensing platform is an aircraft.

* * * * *